(12) United States Patent
Hui et al.

(10) Patent No.: US 11,115,897 B2
(45) Date of Patent: Sep. 7, 2021

(54) ENERGY-EFFICIENT MULTI-HOP COMMUNICATION SCHEMES FOR WIRELESS NETWORKS

(71) Applicant: Telefonaktiebolaget LM Ericsson (publ), Stockholm (SE)

(72) Inventors: Dennis Hui, Sunnyvale, CA (US); Songnam Hong, Yongin-si (KR); Ivana Maric, Stamford, CT (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 15/564,376

(22) PCT Filed: Apr. 14, 2016

(86) PCT No.: PCT/IB2016/052139
§ 371 (c)(1),
(2) Date: Oct. 4, 2017

(87) PCT Pub. No.: WO2016/166705
PCT Pub. Date: Oct. 20, 2016

(65) Prior Publication Data
US 2018/0139680 A1   May 17, 2018

Related U.S. Application Data

(60) Provisional application No. 62/148,050, filed on Apr. 15, 2015.

(51) Int. Cl.
*H04W 40/16* (2009.01)
*H04L 12/721* (2013.01)
(Continued)

(52) U.S. Cl.
CPC .......... *H04W 40/16* (2013.01); *H04L 45/021* (2013.01); *H04L 45/122* (2013.01);
(Continued)

(58) Field of Classification Search
CPC .... H04W 40/16; H04L 45/021; H04L 45/122; H04L 45/123; H04L 45/127; H04L 45/16;
(Continued)

(56) References Cited

U.S. PATENT DOCUMENTS

2008/0232258 A1* 9/2008 Larsson ................ H04L 45/00
370/238
2008/0279101 A1* 11/2008 Wu ...................... H04L 45/123
370/235
(Continued)

FOREIGN PATENT DOCUMENTS

| CN | 101848523 A | 9/2010 |
| CN | 103826277 A | 5/2014 |

OTHER PUBLICATIONS

Harry Newton, Newton's Telecom Dictionary 27th Edition, 2013, Flatiron Publishing, p. 465.*
(Continued)

*Primary Examiner* — Maharishi V Khirodhar
*Assistant Examiner* — Kenneth P Hunt
(74) *Attorney, Agent, or Firm* — Baker Botts, LLP

(57) ABSTRACT

A method in a node is disclosed. The method comprises determining (1304) a first route from a first source node (505 A) to a destination (510), the first route comprising one or more relay nodes (515, 615). The method comprises determining (1308) an energy-harvesting routing metric, the energy-harvesting routing metric for use in determining a second route from a second source node (505B) to the destination (510). The method comprises determining (1312) the second route from the second source node (505B) to the destination (510), the determined second route comprising one or more relay nodes (515, 615) selected to maximize the determined energy-harvesting routing metric.

33 Claims, 18 Drawing Sheets

(51) Int. Cl.
*H04L 12/733* (2013.01)
*H04L 12/755* (2013.01)
*H04L 12/761* (2013.01)

(52) U.S. Cl.
CPC .......... *H04L 45/123* (2013.01); *H04L 45/127* (2013.01); *H04L 45/16* (2013.01); *Y02D 30/70* (2020.08)

(58) Field of Classification Search
CPC . H04L 1/0076; H04L 1/0077; Y02D 70/1262; Y02D 70/164; Y02D 70/24; Y02D 70/1242; Y02D 70/1224; Y02D 70/142; Y02D 70/1264; Y02D 70/23; Y02D 70/21; Y02D 70/146; Y02D 70/22; Y02D 70/34; Y02D 70/00; H04B 7/15521; H04B 7/15592
See application file for complete search history.

(56) References Cited

U.S. PATENT DOCUMENTS

| | | | | |
|---|---|---|---|---|
| 2010/0246480 | A1* | 9/2010 | Aggarwal | H04L 45/123 370/328 |
| 2011/0051652 | A1 | 3/2011 | Kubo et al. | |
| 2013/0188475 | A1 | 7/2013 | Lim et al. | |
| 2014/0171094 | A1* | 6/2014 | Noh | H04W 40/22 455/452.1 |
| 2014/0226699 | A1* | 8/2014 | Kim | H04B 7/15 375/211 |
| 2017/0070321 | A1* | 3/2017 | Wu | H04W 40/12 |

OTHER PUBLICATIONS

Maxim Integrated, "Glossary Definition of Energy Harvesting," May 16, 2011, highlighted, https://www.maximintegrated.com/en/glossary/definitions.mvp/term/Energy%20Harvesting/gpk/1144.*
AmbioSystems, "Concept of Energy Harvesting," Oct. 29, 2007, highlighted, http://www.ambiosystems.com/index.php/2-uncategorised/13-concept-of-energy-harvesting.*
M. K. Jakobsen, J. Madsen and M. R. Hansen, M. K. Jakobsen, J. Madsen and M. R. Hansen, "DEHAR: A distributed energy harvesting aware routing algorithm for ad-hoc multi-hop wireless" 2010 IEEE International Symposium on "A World of Wireless, Mobile and Multimedia Networks" (WoWMoM), Montreal, QC, 2010, pp. 1-9.*
Sagentia, "Energy Harvesting" 2011 https://www.sagentia.com/files/2015/12/Energy-Harvesting.pdf.*
Nass, "3 Questions Answered by an Energy Harvesting Expert," Feb. 11, 2014, https://www.designnews.com/electronics-test/3-questions-answered-energy-harvesting-expert/115672764731515.*
Federal Communication Commission, "Interference with Radio, TV and Telephone Signals," Nov. 16, 2014 https://www.fcc.gov/consumers/guides/interference-radio-tv-and-telephone-signals.*
Wikipedia, "Interference (communication)" May 5, 2008, https://en.wikipedia.org/wiki/Interference_(communication).*
Wikipedia, "Interference (communication)" May 5, 2008, https://en.wikipedia.org/wiki/lnterference_(communication).*
A. S. Avestimehr, S. N. Diggavi and D. N. C. Tse, "Wireless Network Information Flow: A Deterministic Approach," in IEEE Transactions on Information Theory, vol. 57, No. 4, pp. 1872-1905, Apr. 2011, doi: 10.1109/TIT.2011.2110110. https://ieeexplore.IEEE.org/stamp/stamp.jsp?tp=&arnumber=5730555 (Year: 2011).*
McGraw Hill Dictionary of Electrical and Computer Engineering, 2004, McGraw Hill p. 301.*
Sachin Katti,Shyamnath Gollakota, and Dina Katabi Embracing Wireless Interference: Analog Network Coding. 2007 ACM SIGCOMM Computer Communication Review https://www.researchgate.net/publication/37996939_Embracing_Wireless_lnterference_Analog_Network_Coding (Year: 2007).*
Dong Fang, Peng Li, A. Burr and R. de Lamare, "Physical-layer network coding based interference exploitation strategy for multi-user hierarchical wireless networks," 2012 European Wireless 18th European Wireless Conference 2012, 2012, pp. 1-6 https://ieeexplore.ieee.org/abstract/document/6216851 (Year: 2012).*
Dehar: a Distributed Energy Harvesting Aware Routing Algorithm for Ad-hoc Multi-hop Wireless Sensor Networks by Mikkel Koefoed Jakobsen et al.—2010 IEEE.
Efficient Subnetwork Selection in Relay Networks by Siddhartha Brahma et al.—2009.
Impact of Network Density on Data Aggregation in Wireless Sensor Networks by Chalermek Intanagonwiwat et al.—2001.
Mixed Noisy Network Coding and Cooperative Unicasting in Wireless Networks by Arash Behboodi et al.; IEEE Transactions on Information Theory, vol. 61, No. 1—Jan. 2015.
PCT Notification of Transmittal of the International Search Report and the Written Opinion of the International Searching Authority, or the Declaration for International application No. PCT/IB2016/052139—dated Aug. 30, 2016.

* cited by examiner (b) step 2

Iterative Algorithm:
fixed the new route and update the previous route (d) step 4

ENERGY-EFFICIENT MULTI-HOP COMMUNICATION SCHEMES FOR WIRELESS NETWORKS

PRIORITY

This nonprovisional application is a U.S. National Stage Filing under 35 U.S.C. § 371 of International Patent Application Serial No. PCT/SE2016/052139 filed Apr. 14, 2016, and entitled "Energy-Efficient Multi-hop Communication Schemes For Wireless Networks" which claims priority to U.S. Provisional Patent Application No. 62/148,050 filed Apr. 15, 2015, both of which are hereby incorporated by reference in their entirety.

TECHNICAL FIELD

The present disclosure relates, in general, to wireless communications and, more particularly, to energy-efficient multi-hop communication schemes for wireless networks.

BACKGROUND

To cope with the exponential growth in wireless data traffic, it is anticipated that substantially denser deployments of base stations or wireless access nodes will be required in the future. The feasibility of a very dense deployment of wireless access nodes is predicated on the existence of a backhaul network that can provide high-data-rate transport for each individual access node in the network. From the point of view of maximizing capacity, optical-fiber-based backhaul solutions are probably the most desirable and are most suitable for new constructions. However, in existing buildings and infrastructure, the cost of installing new fibers to every access node in a very dense network can be prohibitive.

An alternative is the wireless self-backhaul solution, where the same access spectrum is used to provide transport. With self-backhauling, an access node serves not only its own assigned user equipment (UEs) in its vicinity, but also its neighboring access nodes as a relaying node in order to transfer data towards and/or from an information aggregation node (AgN) in the network. A group of self-backhauling access nodes can form a multi-hop mesh network. Access nodes cooperatively transfer each other's traffic to and from the aggregation node.

Due to the broadcast nature of the wireless medium, interference becomes a main limiting factor on network throughput for a wireless multi-hop backhaul network. Interference-aware routing has been proposed and shown to offer a significant throughput gain over shortest-path routing. A joint routing and resource allocation for wireless self-backhaul networks was presented in "Joint Routing and Resource Allocation for Wireless Self-Backhaul in an Indoor Ultra-Dense Network," Proc. IEEE Int. Symp. Personal, Indoor and Mobile Radio Comm., pp. 3083-3088, London, U K, 2013 ("Joint Routing and Resource Allocation"). Because it is assumed that each relay decodes its desired message by treating other signals as noise, an interference-aware routing algorithm aims to avoid inter-path interference. It was shown in "Joint Routing and Resource Allocation," however, that this approach incurs significant limitation on network throughput at high load (i.e., the number of sources is large). This result is expected since it is nearly impossible to avoid all inter-path interference at high load. Furthermore, because the transmission rate on every route is determined by the minimum of all link-capacities on the route, one strong interference on a path can drastically degrade the end-to-end performance. Thus, there is a need for a more advanced coding scheme that can efficiently manage strong interference instead of simply treating it as noise.

SUMMARY

To address the foregoing problems with existing approaches, disclosed is a method in a node. The method comprises determining a first route from a first source node to a destination, the first route comprising one or more relay nodes. The method comprises determining an energy-harvesting routing metric, the energy-harvesting routing metric for use in determining a second route from a second source node to the destination. The method comprises determining the second route from the second source node to the destination, the determined second route comprising one or more relay nodes selected to maximize the determined energy-harvesting routing metric.

In certain embodiments, the first route and the second route may comprise different numbers of relay nodes. The determined first route may comprise a route having a shortest number of hops between the first source node and the destination. Maximizing the energy-harvesting routing metric may comprise maximizing an achievable rate between consecutive relay nodes. The energy-harvesting routing metric may comprise a multiple input multiple output (MIMO) channel capacity. The energy-harvesting routing metric may be a function of signal-to-noise ratios. The energy-harvesting metric may be determined to maximize interference between routes. The relay nodes may perform noisy network coding.

In certain embodiments, determining the second route from the second source node to the destination may comprise: determining one or more first candidate relay nodes, the first candidate relay nodes located within a communication range of the second source node; determining which of the one or more first candidate relay nodes maximizes the energy-harvesting routing metric, wherein the determination of which of the one or more first candidate relay nodes maximizes the energy-harvesting routing metric is based on energy-harvesting routing metrics of the first source node, the second source node, and a first relay node of the first route; and selecting a first candidate relay node that maximizes the energy-harvesting routing metric as the first relay node of the second route. In certain embodiments, the method may comprise determining one or more second candidate relay nodes, the second candidate relay nodes located within a communication range of the selected first relay node of the second route; determining which of the one or more second candidate relay nodes maximizes the energy-harvesting routing metric, wherein the determination of which of the one or more second candidate relay nodes maximizes the energy-harvesting routing metric is based on energy-harvesting routing metrics of the first relay node of the first route, the first relay node of the second route, and a second relay node of the first route; and selecting a second candidate relay node that maximizes the energy-harvesting routing metric as the second relay node of the second route.

In certain embodiments, the method may comprise optimizing the determined first route based on the determined second route, the second route comprising one or more relay nodes selected according to the determined energy-harvesting routing metric, wherein the optimized first route maximizes the energy-harvesting routing metric. In certain embodiments, optimizing the determined first route based on the determined second route may comprise: determining one or more third candidate relay nodes, the third candidate relay nodes located within a communication range of the first source node; determining which of the one or more third candidate relay nodes maximizes the energy-harvesting routing metric, wherein the determination of which of the one or more third candidate relay nodes maximizes the energy-harvesting routing metric is based on the energy-harvesting routing metric of the first source node, the second source node, and a first relay node of the second route; and selecting a third candidate relay node that maximizes the energy-harvesting routing metric as a new first relay node of the first route. In certain embodiments, the method may comprise determining one or more fourth candidate relay nodes, the fourth candidate relay nodes located within a communication range of the new first relay node of the first route; determining which of the one or more fourth candidate relay nodes maximizes the energy-harvesting routing metric, wherein the determination of which of the one or more fourth candidate relay nodes maximizes the energy-harvesting routing metric is based on the energy-harvesting routing metric of the new first relay node of the first route, the first relay node of the second route, and the second relay node of the second route; and selecting a fourth candidate relay node that maximizes the energy-harvesting routing metric as a new second relay node of the first route.

In certain embodiments, the method may comprise optimizing the determined second route based on the optimized first route, wherein the optimized second route maximizes the energy-harvesting routing metric. In certain embodiments, the method may comprise continuing to optimize the determined first and second routes until the energy-harvesting routing metric for both the first and second routes exceeds a threshold value.

In certain embodiments, the method may comprise: defining a plurality of subnetworks, the defined plurality of subnetworks comprising at least a first subnetwork comprising the destination and the first and second source nodes and a second subnetwork comprising a second destination and a plurality of source nodes associated with the second destination, the plurality of source nodes including at least one additional source node; determining a first route for the second subnetwork from one of the plurality of source nodes associated with the second destination to the second destination, the first route for the second subnetwork comprising one or more relay nodes; determining a second route for the second subnetwork from another of the plurality of source nodes associated with the second destination to the second destination, the determined second route for the second subnetwork comprising one or more relay nodes selected to maximize the determined energy-harvesting routing metric; and optimizing the determined first route for the second subnetwork based on the determined second route for the second subnetwork, the second route for the second subnetwork comprising one or more relay nodes selected according to the determined energy-harvesting routing metric, wherein the optimized first route for the second subnetwork maximizes the energy-harvesting routing metric. In certain embodiments, the first route for the second subnetwork may be determined using interference-aware routing.

Also disclosed is a node. The node comprises one or more processors. The one or more processors are configured to determine a first route from a first source node to a destination, the first route comprising one or more relay nodes. The one or more processors are configured to determine an energy-harvesting routing metric, the energy-harvesting routing metric for use in determining a second route from a second source node to the destination. The one or more processors are configured to determine the second route from the second source node to the destination, the determined second route comprising one or more relay nodes selected to maximize the determined energy-harvesting routing metric.

Also disclosed is a computer program product. The computer program product comprises instructions stored on non-transient computer-readable media which, when executed by one or more processors, perform the acts of: determining a first route from a first source node to a destination, the first route comprising one or more relay nodes; determining an energy-harvesting routing metric, the energy-harvesting routing metric for use in determining a second route from a second source node to the destination; and determining the second route from the second source node to the destination, the determined second route comprising one or more relay nodes selected to maximize the determined energy-harvesting routing metric.

Certain embodiments of the present disclosure may provide one or more technical advantages. For example, certain embodiments may advantageously improve data throughput over the conventional (single-route) routing solution. As another example, in certain embodiments interfering signals received at a relay node are forwarded through QMF and treated as a useful signal at the destination node, which may advantageously result in better performance when the network is dense and interference is high. As still another example, certain embodiments may provide for longer one-hop transmission, which may advantageously increase network throughput by decreasing the number of relay stages. As yet another example, certain embodiments may advantageously be more efficient in avoiding inter-network interference than interference-aware routing. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
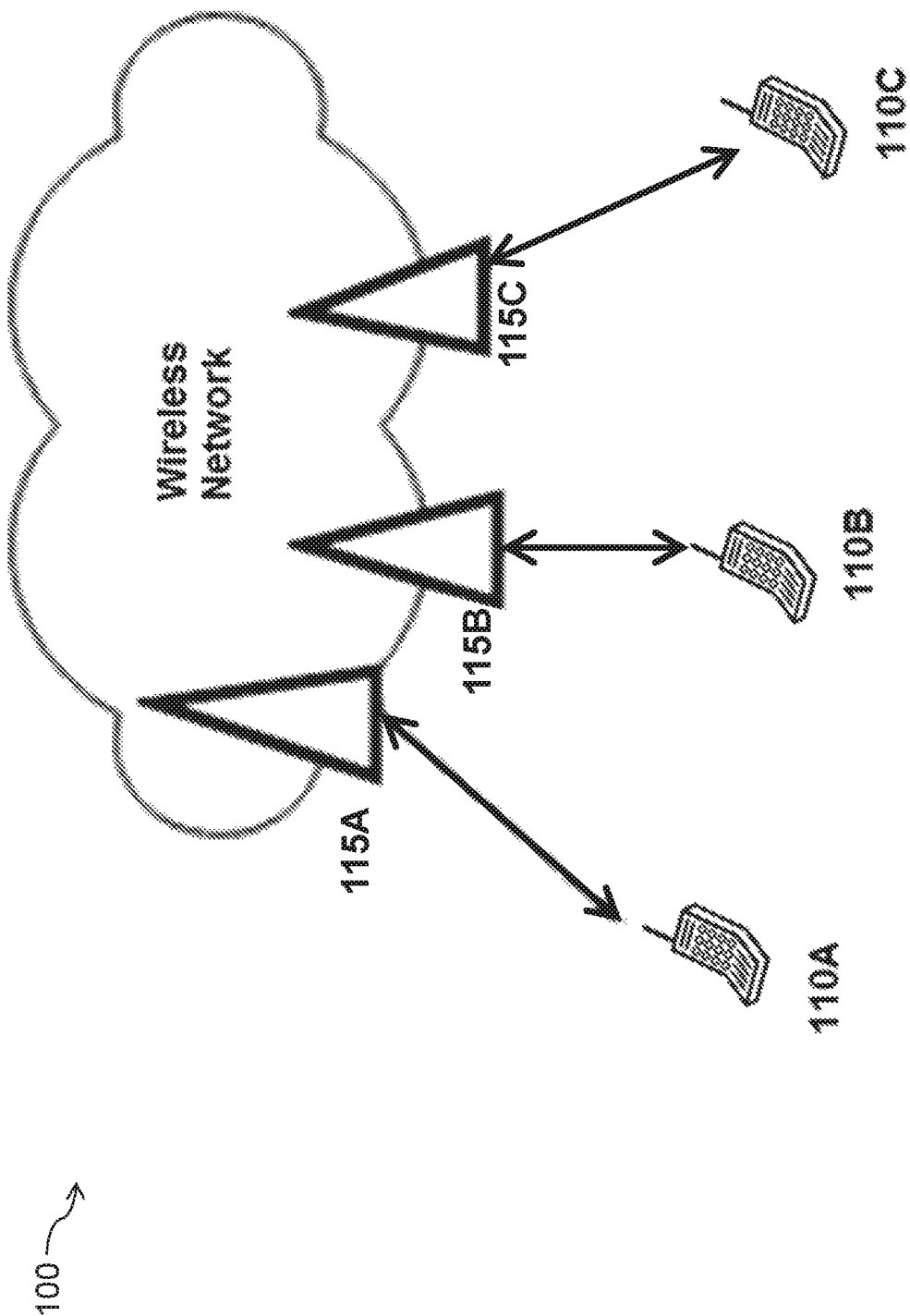
FIG. 1 is a diagram illustrating an embodiment of a wireless communication network, in accordance with certain embodiments.

As described above, existing approaches (including inter-ference-aware routing) suffer from certain deficiencies. In interference-aware routing, each relay on a route decodes its desired message (by treating other signals as noise), re-encodes it and then forward. This relay operation is referred to as decode-and-forward (DF). To minimize interference at the nodes, interference-aware routing establishes routes that are as far from each other as possible. This approach, however, incurs significant limitation on network through-put at high load. Furthermore, because the transmission rate on every route is determined by the minimum of all link-capacities on the route, one strong interference on a path can drastically degrade the end-to-end performance. Thus, there is a need for a more advanced coding scheme that can efficiently manage strong interference instead of simply treating it as noise.

In contrast to an interference-aware routing approach, the present disclosure contemplates a transmission scheme in which operation at a relay is quantize-map-forward (QMF) or, more generally, noisy network coding (NNC) rather than DF. QMF is known in the art and described in S. Avestimehr, S. Diggavi, and D. Tse, "Wireless network information flow: A deterministic approach," IEEE Trans. Inf. Theory, vol. 57, pp. 1872-1905, April 2011., the entirety of which is hereby incorporated by reference as if fully set forth herein. NNC is known in the art and described in S. Lim, Y. H. Kim, A. E. Gamal, and S. Chung, "Noisy Network Coding," IEEE Trans. Inf. Theory, vol. 57, pp. 3132-3152, the entirety of which is hereby incorporated by reference as if fully set forth herein. According to certain embodiments described herein, routes are established via energy-harvesting routing.

For example, in certain embodiments a method in a node is disclosed. The node determines a first route from a first source node to a destination. The first route comprises one or more relay nodes, and may be a route having a shortest number of hops between the first source node and the destination. The node determines an energy-harvesting routing metric. The energy-harvesting routing metric may be used to determine a second route from a second source node to the destination. For example, in certain embodiments the energy-harvesting routing metric may be a multiple input multiple output (MIMO) channel capacity or a function of signal-to-noise ratios (SNR). The node determines the second route from the second source node to the destination. The determined second route comprises one or more relay nodes selected to maximize the determined energy-harvesting routing metric. In certain embodiments, maximizing the energy-harvesting routing metric comprises maximizing an achievable rate between consecutive relay nodes.

As described in more detail below, in certain embodiments the node may optimize the determined first route based on the determined second route, the second route comprising one or more relay nodes selected according to the determined energy-harvesting routing metric, wherein the optimized first route maximizes the energy-harvesting routing metric. In some cases, the node may optimize the determined second route based on the optimized first route, wherein the optimized second route maximizes the energy-harvesting routing metric. In some cases, the node may continue to optimize the determined first and second routes until the energy-harvesting metric for both the first and second routes exceeds a threshold value.

Energy-harvesting routing refers to a family of routing methods in which the metric is chosen such as to maximize interference between routes, or equivalently, to choose the routes to be as close as possible. This stands very much in contrast to interference-aware routing. Instead of using DF, each of the one or more relay nodes deploys QMF/NNC operation, in which the relay quantizes the observed signal, re-encodes it and forwards the signal. Because the relay node does not decode the message, there is no decoding constraint at the relay (unlike DF). In fact, any interfering signal that is received at the relay node will be forwarded through QMF and treated as a useful signal at the destination node. For this reason, QMF/NNC actually performs better when the network is dense and interference is higher. As such, as used herein, (and as may be for fully understood from the below description) an interfering signal can in some instances be useful, and the term interference as used herein therefore refers to any mixture of two or more signals and interfering signals refer to signals that mix with each other and not necessarily harmful signals. A signal may be referred to as both an interfering signal when it mixes with another signal, but the same interfering signal may also be referred to as a useful signal when the mixing of signals does not adversely affect decoding of the signal.

This improved performance is shown in S. Hong, I. Maric and D. Hui, "A Novel Cooperative Strategy for Wireless Multihop Backhaul Networks," included in U.S. Provisional Application 62/148,050 filed Apr. 15, 2015, the entirety of which is hereby incorporated by reference as if fully set forth herein. Additional details are also shown in S. Hong, I. Maric and D. Hui, "A Novel Relaying Strategy for Wireless Multihop Backhaul Networks," IEEE Globecom, San Diego, 6-10 Dec. 2015 (also included in U.S. Provisional Application 62/148,050 filed Apr. 15, 2015), the entirety of which is hereby incorporated by reference as if fully set forth herein.

The various embodiments described herein can be exploited in any network scenario in which data is sent through relays. Therefore, it applies to wireless networks in general and particular applications such as multi-hop back-haul, network-assisted D2D communications, cellular networks with relays, and any other suitable applications. One of ordinary skill in the art would realize that various communication nodes (e.g., UE or other station) could perform the various processes described herein.

FIG. 1 is a diagram illustrating an embodiment of a wireless communication network 100, in accordance with certain embodiments. Network 100 includes one or more UE(s) 110 (which may be interchangeably referred to as wireless devices 110), network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In certain embodiments, UE 110 may be configured to operation in out-of-network coverage scenarios.

Also, in some embodiments generic terminology, "radio network node" (or simply "network node") is used. It can be any kind of network node, which may comprise an aggregation node (AgN), a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME etc), O&M, OSS, SON, positioning node (e.g., E-SMLC), MDT, or any suitable network node. A network node is an even more general term, which may be a radio network node or a core network node (e.g., TCE, MME, MDT node, MBMS node) or even an external node (e.g., $3^{rd}$ party node, a node external to the current network). Note that any radio network node is a network node, but not any network node is a radio network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 14-18.

Although FIG. 1 illustrates a particular arrangement of network 100, the present disclosure contemplates that the various embodiments described herein may be applied to a variety of networks having any suitable configuration. As described in more detail below in relation to FIGS. 2-13, network 100 may be a mesh network having any configuration and including any suitable number of source nodes, relay nodes (which may be interchangeably referred to as relays), and destinations. Furthermore, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

In the following description, numerous specific details are set forth. However, it is understood that the various embodiments described herein may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "certain embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 2:
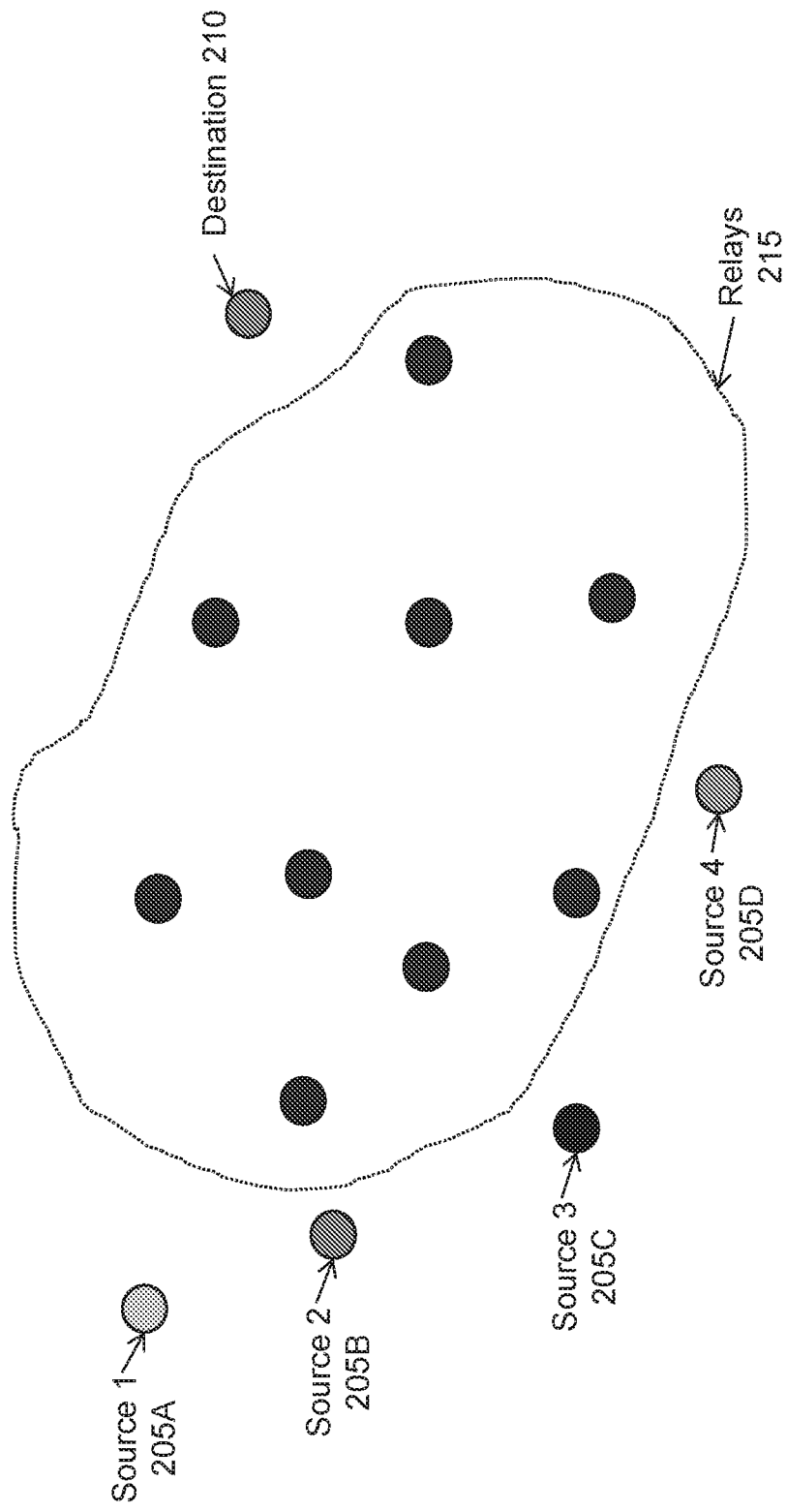
FIG. 2 illustrates an example wireless mesh network including multiple source nodes and one destination, in accordance with certain embodiments.

FIG. 2 illustrates an example wireless mesh network including multiple source nodes and one destination, in accordance with certain embodiments. More specifically, FIG. 2 illustrates a plurality of source nodes 205 (e.g., source nodes 205A-D). As shown in FIG. 2, source node 205A may be a first source node, source node 205B may be a second source node, source node 205C may be a third source node, and source node 205D may be a fourth source node. FIG. 2 also illustrates destination node 210 (which may be interchangeably referred to as destination 210 and/or aggregation node 210). FIG. 2 also illustrates a number of relay nodes 215.

Source nodes 205A-D, destination node 210, and relay nodes 215 may be any suitable nodes. For example, in certain embodiments source nodes 205A-D, destination node 210, and relay nodes 215 may comprise any suitable combination of network nodes and/or wireless devices, such as network nodes 115 and wireless devices 110 described above in relation to FIG. 1 and in more detail below with respect to FIGS. 14-18. As one example, in certain embodiments source nodes 205A-D may be wireless devices, such as wireless devices 110 described above in relation to FIG. 1, destination node 210 may be a network node (such as network node 115 described above in relation to FIG. 1, for example an eNB, WLAN AP, an aggregation node, or any other suitable network node), and relay nodes 215 may be any suitable type of network nodes (such as network nodes 115 described above in relation to FIG. 1).

As described above, the various embodiments described herein may be applicable to communication from multiple data sources (e.g., source nodes 205A-D) to a common destination (e.g., destination 210) through a mesh/multi-hop network, as shown in FIG. 2. In the example of FIG. 2, data is sent from one or more of source nodes 205A-205B to destination 210. The data sent from source nodes 205A-205D is sent via relays 215 via multi-hop communications. The path from one of source nodes 205A-D (e.g., source node 205A) to destination 210 may include any suitable number of relay nodes 215. Although certain embodiments may be illustrated using two source nodes and a single destination, the present disclosure contemplates that the various embodiments are applicable to any suitable number of source nodes (including more than two source nodes), destination nodes (including more than one destination node), and relay nodes.

Figure 3:
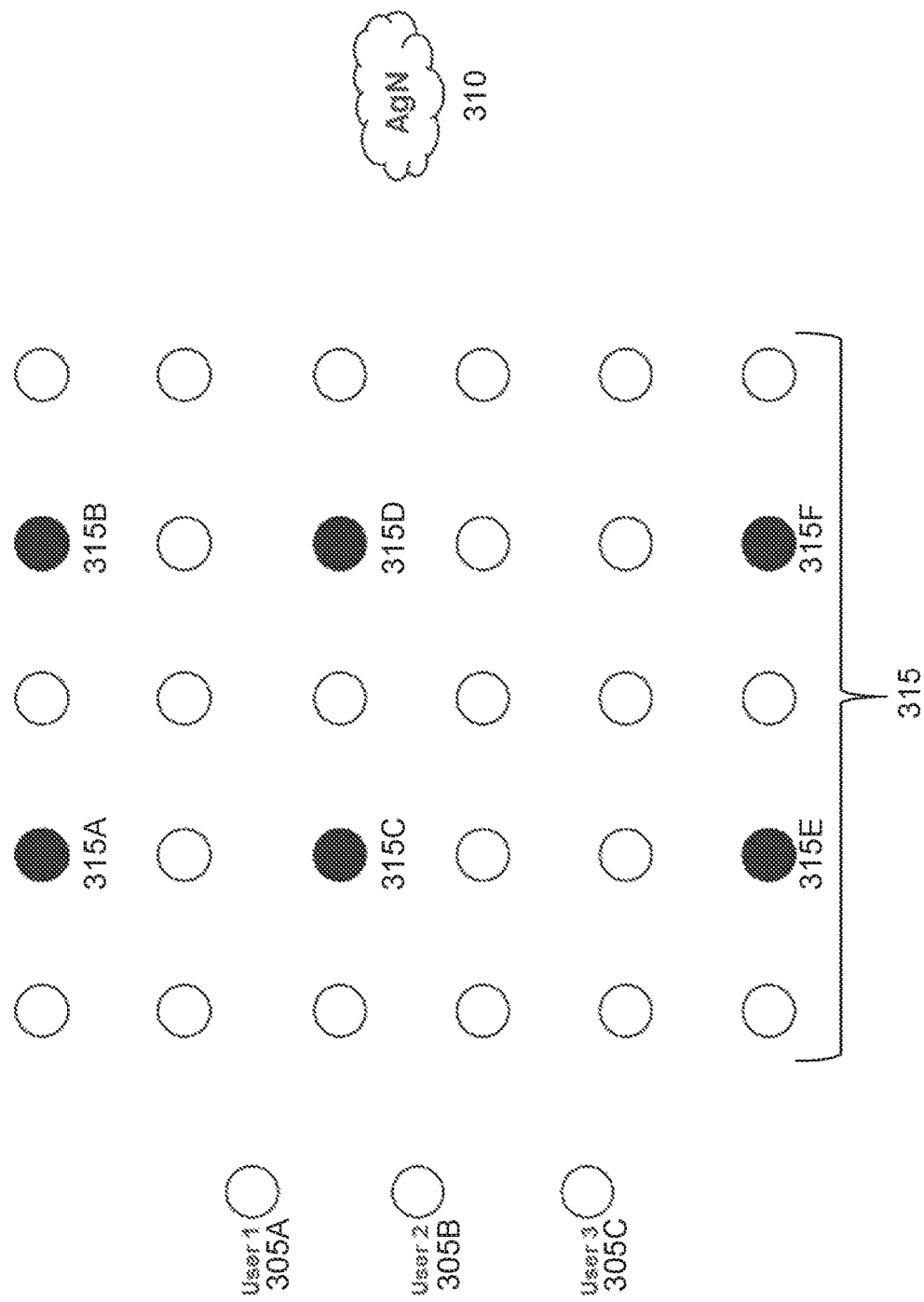
FIG. 3 illustrates an example of interference-aware routing.

FIG. 3 illustrates an example of interference-aware routing. More specifically, FIG. 3 illustrates a plurality of source nodes 305 (e.g., source nodes 305A-C). As shown in FIG. 3, source node 305A may be a first source node (e.g., User 1), source node 305B may be a second source node (e.g., User 2), and source node 305C may be a third source node (e.g., User 3). FIG. 3 also illustrates destination node 310. (which may be interchangeably referred to as destination 310 and/or aggregation node 310). FIG. 3 also illustrates a number of relay nodes 315.

Source nodes 305A-C, destination node 310, and relay nodes 315 may be any suitable nodes. For example, in certain embodiments source nodes 305A-C, destination node 310, and relay nodes 315 may comprise any suitable combination of network nodes and/or wireless devices, such as network nodes 115 and wireless devices 110 described above in relation to FIG. 1 and in more detail below with respect to FIGS. 14-18). As one example, in certain embodiments source nodes 305A-C may be wireless devices, such as wireless devices 110 described above in relation to FIG. 1. Destination node 310 may be a network node (such as network node 115 described above in relation to FIG. 1, for example an eNB, WLAN AP, an aggregation node, or any other suitable network node), and relay nodes 315 may be any suitable type of network nodes (such as network nodes 115 described above in relation to FIG. 1).

In the example of FIG. 3, data is sent from one or more of source nodes 305A-C to destination 310. The data sent from source nodes 305A-C is sent via relays 315 via multi-hop communications. The path from one of source nodes 305A-C to destination 310 may include any suitable number of relay nodes 315. In interference-aware routing (which may be interchangeably referred to as interference-avoidance routing), each relay 315 along a route from one of source nodes 305A-C to destination 310 may perform DF (i.e., each relay 315 decodes its desired message (by treating other signals as noise), re-encodes it and then forwards it along the path). To minimize interference at the nodes, interference-aware routing establishes routes that are as far from each other as possible. To illustrate, assume that each of source nodes 305A-305C has data to send to destination 310. In the example of FIG. 3, the route from source node 305A to destination 310 includes relays 315A and 315B, the route from source node 305B to destination 310 includes relays 315C and 315D, and the route from source node 305C to destination 310 includes relays 315E and 315F. Each of relays 315A-F perform DF operation. As shown in the example of FIG. 3, the routes from each of source nodes 305A-C are selected to be as far from each other as possible.

As described above, interference becomes a main limiting factor on network throughput for wireless multi-hop backhaul network. In interference-aware routing, each relay 315 decodes its desired message by treating other signals as noise. Interference-aware routing algorithms aim to avoid inter-path interference. This approach incurs significant limitation on network throughput at high load (i.e., the number of sources is large). This result is expected since it is nearly impossible to avoid all inter-path interference at high load. Furthermore, because the transmission rate on every route is determined by the minimum of all link-capacities on the route, one strong interference on a path can drastically degrade the end-to-end performance.

Figure 4:
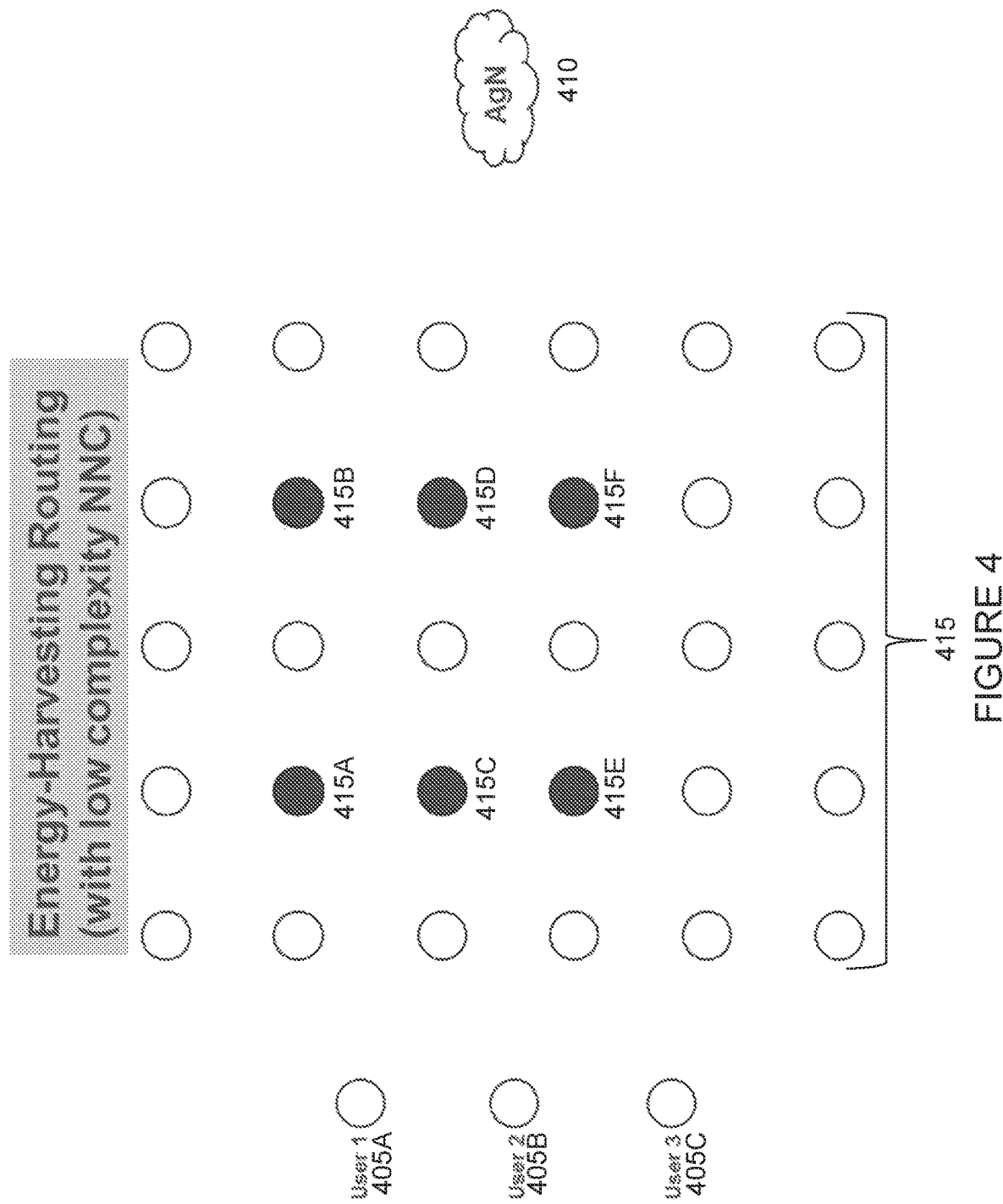
FIG. 4 illustrates an example of energy-harvesting routing, in accordance with certain embodiments.

FIG. 4 illustrates an example of energy-harvesting routing, in accordance with certain embodiments. More specifically, FIG. 4 illustrates a plurality of source nodes 405 (e.g., source nodes 405A-C). As shown in FIG. 4, source node 405A may be a first source node (e.g., User 1), source node 405B may be a second source node (e.g., User 2), and source node 405C may be a third source node (e.g., User 3). FIG. 4 also illustrates a destination node 410 (which may be interchangeably referred to as destination 410 and/or aggregation node 410). FIG. 4 also illustrates a number of relay nodes 415.

Source nodes 405A-C, destination node 410, and relay nodes 415 may be any suitable nodes. For example, in certain embodiments source nodes 405A-C, destination 410, and relay nodes 415 may comprise any suitable combination of network nodes and/or wireless devices, such as network nodes 115 and wireless devices 110 described above in relation to FIG. 1 and in more detail below with respect to FIGS. 14-18. As one example, in certain embodiments source nodes 405A-C may be wireless devices, such as wireless devices 110 described above in relation to FIG. 1. Destination node 410 may be a network node (such as network node 115 described above in relation to FIG. 1, for example an eNB, WLAN AP, an aggregation node, or any other suitable network node), and relay nodes 415 may be any suitable type of network nodes (such as network nodes 115 described above in relation to FIG. 1). Data may be sent from one or more of source nodes 405A-C to destination 410. The data sent from source nodes 405A-C is sent via relays 415 via multi-hop communications. The path from one of source nodes 405A-C to destination 410 may include any suitable number of relay nodes 415.

Energy-harvesting routing refers to a family of routing methods in which the metric is chosen to maximize interference between routes, or equivalently, to choose the routes to be as close as possible. To illustrate, assume in the example of FIG. 4 that each of source nodes 405A-C has data to send to destination 410. In the example of FIG. 4, the route from source node 405A to destination 410 includes relays 415A and 415B, the route from source node 405B to destination 410 includes relays 415C and 415D, and the route from source node 405C to destination 410 includes relays 415E and 415F. As can be seen from FIG. 4, the routes from source nodes 405A-C to destination 410 are chosen to be as close together as possible.

Each of relays 415A-F performs QMF (or, more generally, NNC). In such a case, each relay 415 quantizes the observed signal, re-encodes it and forwards the signal toward the next node on the route (e.g., another relay 415 or destination node 410). Because relays 415 do not decode the message, there is no decoding constraint at relays 415 (unlike the DF operation in interference-aware routing described above in relation to FIG. 3). In fact, any interfering signal that is received at a relay node 415 will be forwarded through QMF and treated as a useful signal at destination 410. This is in contrast to the interference-aware approach to routing described above, and for this reason, QMF/NNC actually performs better when the network is dense and interference is higher. Energy-harvesting routing is described in more detail below in relation to FIGS. 5-8.

Figure 5:
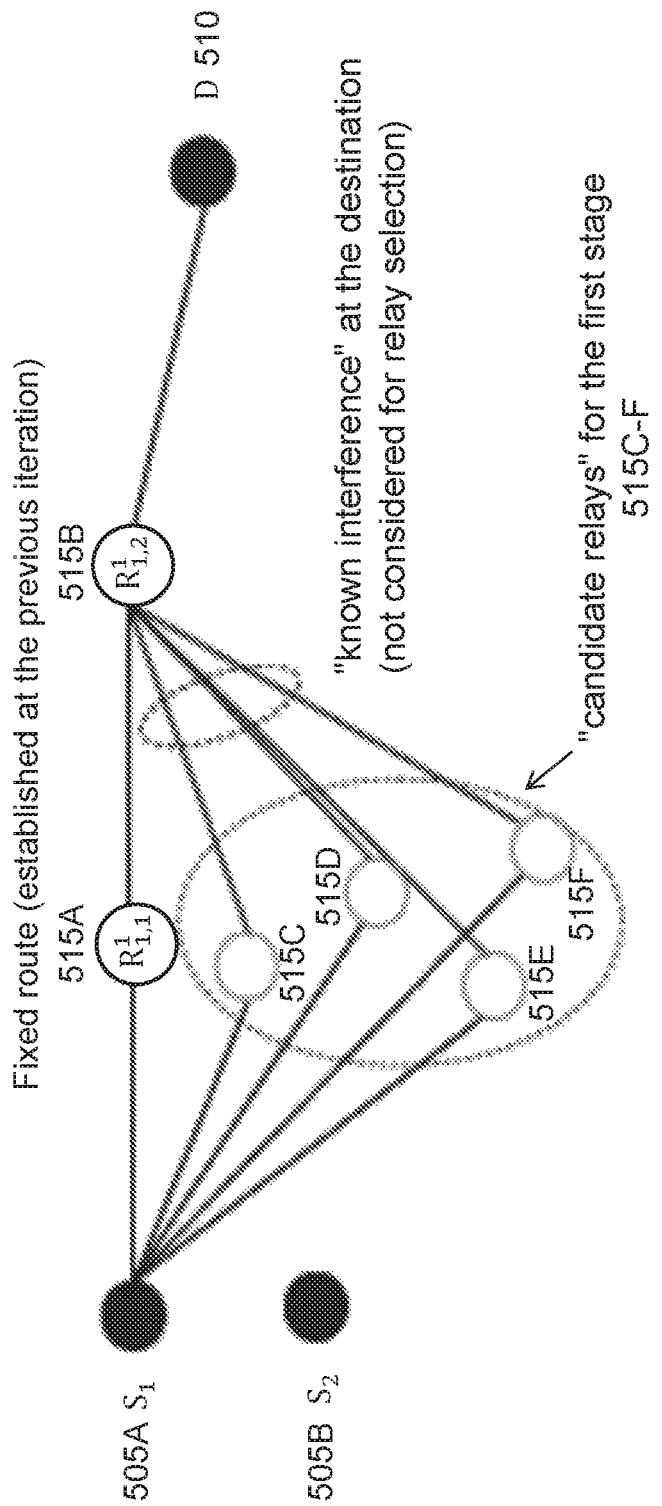
FIG. 5 illustrates a first step of energy-harvesting routing to establish two routes from two source nodes to a destination node, in accordance with certain embodiments.

FIG. 5 illustrates a first step of energy-harvesting routing to establish two routes from two source nodes to a destination node, in accordance with certain embodiments. More particularly, FIG. 5 illustrates two source nodes $S_1$ 505A and $S_2$ 505B, destination 510, and a plurality of relay nodes 515A-F. Source nodes $S_1$ 505A and $S_2$ 505B, destination node 510, and relay nodes 515 may be any suitable nodes. For example, in certain embodiments source nodes $S_1$ 505A and $S_2$ 505B, destination node 510, and relay nodes 515 may comprise any suitable combination of network nodes and/or wireless devices, such as network nodes 115 and wireless devices 110 described above in relation to FIG. 1 and in more detail below with respect to FIGS. 14-18. As one example, in certain embodiments source nodes $S_1$ 505A and $S_2$ 505B may be wireless devices, such as wireless devices 110 described above in relation to FIG. 1. Destination node 510 may be a network node (such as network node 115 described above in relation to FIG. 1, for example an eNB, WLAN AP, an aggregation node, or any other suitable network node), and relay nodes 515 may be any suitable type of network nodes (such as network nodes 115 described above in relation to FIG. 1). Data may be sent from one or more of source nodes $S_1$ 505A and $S_2$ 505B to destination 510. The data sent from source nodes $S_1$ 505A and $S_2$ 505B is sent via relays 515 via multi-hop communications. The path from one of source nodes $S_1$ 505A and $S_2$ 505B to destination 510 may include any suitable number of relay nodes 515.

As described above, energy-harvesting routing refers to a family of routing methods in which the metric is chosen such as to maximize interference between routes, or equivalently, to choose the routes to be as close as possible. This can be done, for example, by choosing the metric that maximizes an achievable rate between every two consecutive relay stages. The energy-harvesting routing metric may be any suitable metric. For example, in certain embodiments the energy harvesting routing metric may be a multiple input multiple output (MIMO) channel capacity or a function of signal-to-noise ratio. Although the example embodiments of FIGS. 5-8 may be described in terms of MIMO channel capacity as the energy-harvesting routing metric, the various embodiments are not limited to such an example and any suitable energy-harvesting metric may be used, including MIMO channel capacity, a function of signal-to-noise ratio, and/or any other suitable energy-harvesting routing metric or combination of energy-harvesting routing metrics.

With respect to the example of FIGS. 5-8, for any choice of relays at the two stages, the achievable rate between every two consecutive relay stages corresponds to a rate in a MIMO channel and can thus be calculated as described in detail below. In some cases, an approximation of such metric can be used to relays at each stage such that the signal power received from the previous stage at each of these relays is maximized, as is also explained in detail below.

An efficient method can be developed using the iterative algorithm described in R. Draves, J. Padhye, and B. Zill, "Routing in Multi-Radio, Multi-Hop Wireless Mesh Networks," in Proc. The Annual International Conference on Mobile Computing and Networking (MobiCom), pp. 114-128, Maui, Hi., September 2014. ("Routing in Multi-Radio"), the entirety of which is hereby incorporated by reference as if fully incorporated herein. More particularly, an efficient method can be developed using the iterative algorithm described in "Routing in Multi-Radio" by properly modifying the routing criterion. In "Routing in Multi-Radio," the algorithm establishes one route at a time while keeping other previously established routes fixed, and repeats the process until little or no improvements in the sum throughput can be made. The routing criterion maximizes each link-capacity on the route which is computed by taking into account interference from all other routes.

For the energy-harvesting routing embodiments described herein, on the other hand, a relay (at stage k) is selected to maximize the MIMO capacity defined by two consecutive stages k−1 and k. A description of this process for a network having two source nodes $S_1$ 505A and $S_2$ 505B is provided in conjunction with the example of FIGS. 5-8. Although the process is described in the context of a network having two source nodes $S_1$ 505A and $S_2$ 505B and a single destination 510, the present disclosure contemplates that the various embodiments are applicable to cases with more than two sources and more than one destination. Generalization to the case with more sources and/or destinations is described in more detail below.

In the following description, the notation $C_{MIMO}(\{R_1, R_2\}, \{R_3, R_4\})$ is used to denote the MIMO capacity induced by two transmitters $\{R_1, R_2\}$ and two receivers $\{R_3, R_4\}$. Initially, a path from $S_1$ 505A to destination 510 is established. The path from $S_1$ 505A to destination 510 may be established in any suitable manner. For example, in certain embodiments the path from $S_1$ 505A to destination 510 is established so that the number of hops is minimized and each link-capacity along the route is maximized (namely, the received power is maximized). This process closely follows the step that establishes the initial route as described in "Routing in Multi-Radio" (incorporated by reference above). As shown in FIG. 5, the route from source node $S_1$ 505A to destination 510 includes relays 515A and 515B. The relays 515A and 515B on the path from $S_1$ 505A to destination 510 are denoted as $R_{1,1}^1$, $R_{1,2}^1$, respectively.

Next, based on the fixed route from $S_1$ 505A to destination 510, a second route from $S_2$ 505B to destination 510 is established. As shown in FIG. 5, as part of the first step one or more first candidate relay nodes 515 are determined. The first candidate relay nodes 515 are located within a chosen communication range from $S_2$ 505B (these relays form the neighborhood of $S_2$) that have not been already chosen for other routes. In the example of FIG. 5, the first candidate relay nodes include relay nodes 515C-F. The communication range is a design parameter that can he determined in any suitable manner. For example, in certain embodiments the communication range may he determined as a function of the transmit power where the transmit power should be larger than a threshold to satisfy network connectivity. For example, let $\tau_1 = \{R_{1,1}, \ldots, R_{1,|\tau_1|}\}$ denote the set of such neighboring relays (i.e., first "candidate relays" of the first stage). For the j-th relay in $\tau_1$, the MIMO capacity (i.e., routing metric) can be computed according to Expression 1 below:

$$C_{MIMO}(\{S_1, S_2\}, \{R_{1,1}^1, R_{1,j}\}), \quad (1)$$

where $R_{1,1}^1$, denotes the first relay of the first route from $S_1$ 505A to destination 510 (i.e., relay node 515A).

Figure 6:
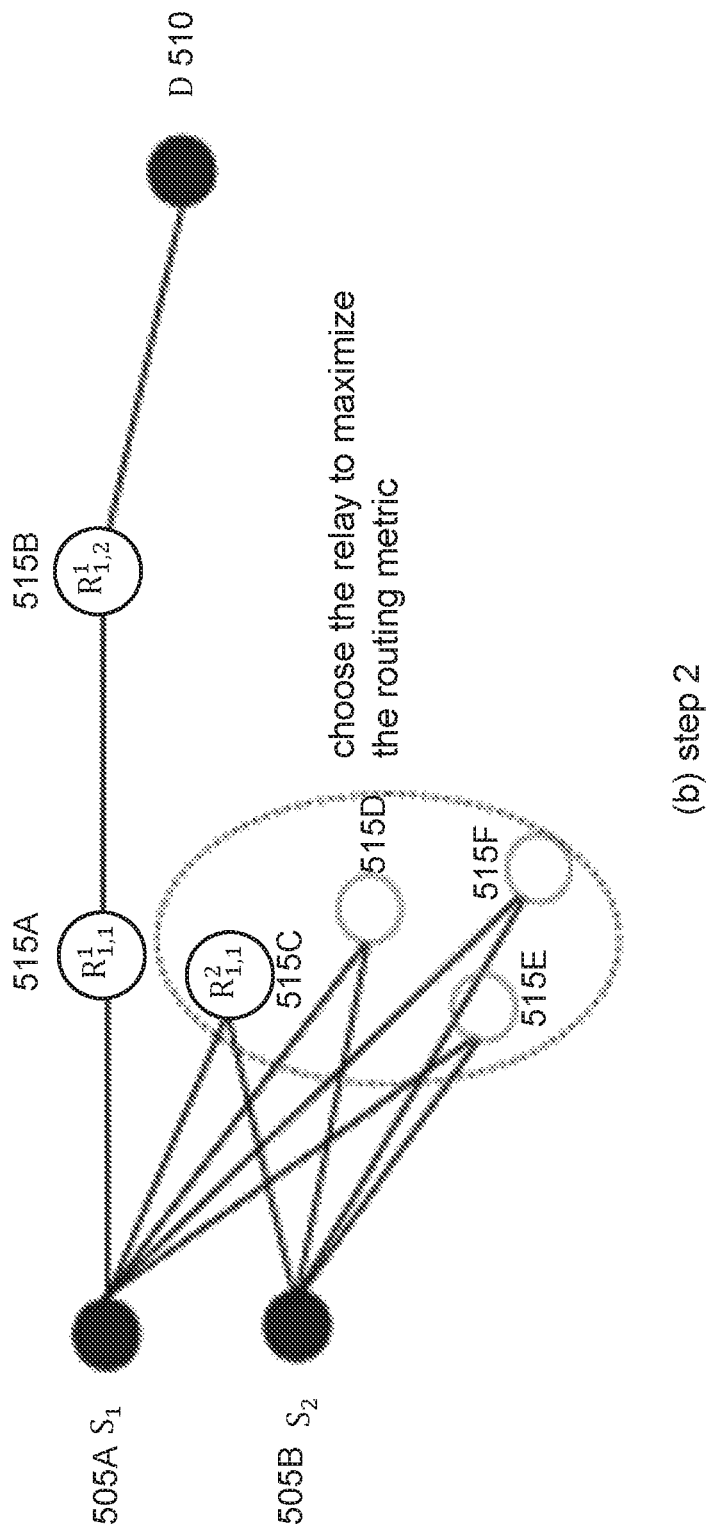
FIG. 6 illustrates a second step of energy-harvesting routing to establish two routes from two source nodes to a destination node, in accordance with certain embodiments.

FIG. 6 illustrates a second step of energy-harvesting routing to establish two routes from two source nodes to a destination node, in accordance with certain embodiments. As described above with respect to FIG. 5, the path from source node $S_1$ 505A to destination 510 includes relay nodes 515A and 515B (denoted as $R_{1,1}^1$, $R_{1,2}^1$, respectively). With $S_1$, $S_2$, $R_{1,1}^1$ fixed, a relay $R_{1,j}$ for the second route from $S_2$ 505B to destination 510 is chosen to maximize the MIMO capacity according to Equation 2 below:

$$j_1^* = \arg\max_{j \in [1:|\tau_1|]} C_{MIMO}(\{S_1, S_2\}, \{R_{1,1}^1, R_{1,j}\}) \quad (2)$$

Thus, according to Equation 2 the candidate relay node that maximizes the energy-harvesting routing metric is selected as the first relay node of the second route from source node $S_2$ 505B to destination 510. In the example of FIG. 6, relay node 515C (denoted $R_{1,1}^2$) is selected as the first rely of the second route.

Figure 7:
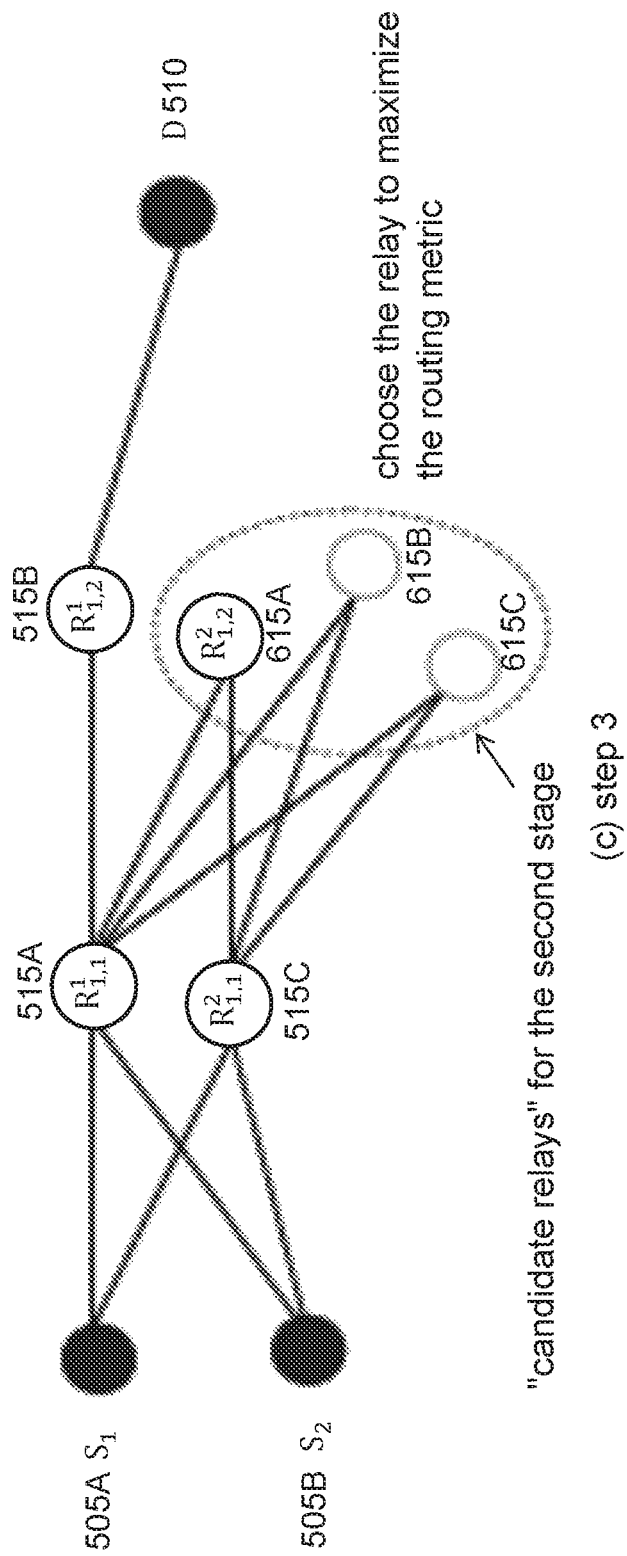
FIG. 7 illustrates a third step of energy-harvesting routing to establish two routes from two source nodes to a destination node, in accordance with certain embodiments.

FIG. 7 illustrates a third step of energy-harvesting routing to establish two routes from two source nodes to a destination node, in accordance with certain embodiments. Like FIGS. 5 and 6, FIG. 7 illustrates source nodes $S_1$ 505A and $S_2$ 505B, destination 510, and a plurality of relay nodes 515A-F. As described above with respect to FIGS. 5 and 6, the path from source node $S_1$ 505A to destination 510 includes relay nodes 515A and 515B (denoted as $R_{1,1}^1$, $R_{1,2}^1$, respectively) and relay node 515C (denoted as $R_{1,1}^2$) has been selected as the first relay node of the second route from source node $S_2$ 505B to destination node 510.

In the third step illustrated in FIG. 7, one or more second candidate relay nodes 615 are determined from which the second relay node of the second route from source node $S_2$ 505B to destination 510 may be selected. In the example of FIG. 7, the one or more second candidate relay nodes include relay nodes 615A-C. The second candidate relay nodes 615A-C are located within a communication range of the selected first relay node 515C of the second route (denoted as $R_{1,1}^2$). For example, let $R_{1,1}^2 = R_{1,j_1}$. At the third step, the method finds the candidate relays of the second stage denoted by $\tau_2 = \{R_{2,1}, \ldots, R_{2,|\tau_2|}\}$. The second relay node of the second route, $R_{2,j}$, is selected from the one or more second candidate relays to maximize the routing metric according to Equation 3 below:

$$j_2^* = \arg\max_{j \in [1:|\tau_2|]} C_{MIMO}(\{R_{1,1}^1, R_{1,1}^2\}, \{R_{1,2}^1, R_{2,j}\}). \quad (3)$$

By setting $R_{1,2}^2 = R_{2,j_2}$, the route from source node $S_2$ 505B to destination 510 can be established. In the example of FIG. 7, relay node 615A (denoted $R_{1,2}^2$) is selected as the second relay of the second route.

Figure 8:
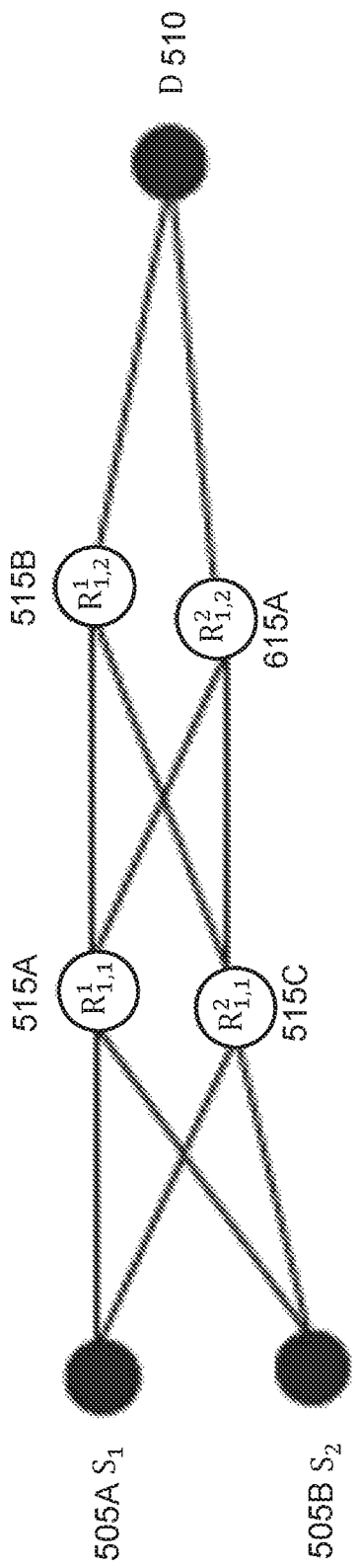
FIG. 8 illustrates a fourth step of energy-harvesting routing to establish two routes from two source nodes to a destination node, in accordance with certain embodiments.

FIG. 8 illustrates a fourth step of energy-harvesting routing to establish two routes from two source nodes to a destination node, in accordance with certain embodiments. As shown in FIG. 8 (and described above in relation to FIGS. 5-7), the route from source node $S_1$ 505A to destination 510 includes relay nodes 515A and 515B (denoted as $R_{1,1}^1$, $R_{1,2}^1$, respectively). The route from node $S_2$ 505B to destination 510 includes relay nodes 515C and 615A (denoted as $R_{1,1}^2$ and $R_{1,2}^2$, respectively). As described above, relay nodes 515C and 615A were selected to maximize the energy-harvesting metric (which, in the example of FIGS. 5-8, is a MIMO channel capacity).

In certain embodiments, the method is iterative. Thus, at the fourth step illustrated in FIG. 8, the process may be repeated to optimize the routes until little or no improvements in the sum throughput can be made. In other words, having established the fixed route from source node $S_2$ 505B to destination 510, the route from source node $S_1$ 505A to destination 510 can be optimized to maximize the energy-harvesting metric. For example, for the route from source node $S_1$ 505A to destination 510, one or more third candidate relay nodes may be determined. The one or more third candidate relay nodes may be within a communication range of source node $S_1$ 505A. Which of the one or more third candidate relay nodes maximizes the energy-harvesting routing metric is determined. The determination of which of the one or more third candidate relay nodes maximizes the energy-harvesting routing metric may be based on the energy-harvesting routing metric of source node $S_1$ 505A, source node $S_2$ 505B, and the first relay node 515C (denoted $R_{1,1}{}^2$) of the second route. A third candidate relay node that maximizes the energy-harvesting routing metric is selected as a new first relay node of the first route (i.e., the route from source node $S_1$ 505A to destination 510). In some cases, the new first relay node of the first route may be the same relay node originally selected as the first relay node of the first route (e.g., relay node 515A) if it maximizes the energy-harvesting metric. In other cases, the new first relay node of the first route may be a different relay node from the relay node originally selected as the first relay node of the first route.

Then, one or more fourth candidate relay nodes are determined, the fourth candidate relay nodes located within a communication range of the new first relay node of the first route. The method determines which of the one or more fourth candidate relay nodes maximizes the energy-harvesting routing metric. The determination of which of the one or more fourth candidate relay nodes maximizes the energy-harvesting routing metric is based on the energy-harvesting routing metric of the new first relay node of the first route, the first relay node 515C (denoted $R_{1,1}{}^2$) of the second route, and the second relay node 615A (denoted $R_{1,2}{}^2$) of the second route. A fourth candidate relay node that maximizes the energy-harvesting routing metric is selected as a new second relay node of the first route.

Thus, given the fixed route from source node $S_2$ 505B to destination 510, the route from source node $S_1$ 505A to destination 510 can be updated. This process can then be repeated to update the second route. For example, the updated route from source node $S_1$ 505A to destination 510 can be used to update the route from source node $S_2$ 505B to destination 510 according to the steps described above. This process can be repeated until little or no improvements in the sum throughput can be made. For example, in certain embodiments the determined first and second routes may continue to be optimized until the energy-harvesting routing metric for both the first and second routes exceeds a threshold value.

As described above, the energy-harvesting routing metric may be any suitable metric. For example, the energy-harvesting routing metric may be a MIMO channel capacity. However, the various embodiments described herein are not limited to such an example. To illustrate, consider the following scenario in which the energy-harvesting routing metric is a function of SNR. Using the example of FIGS. 5-8, let $H_j$ denote the 2×2 channel matrix between the two transmitters $\{S_1, S_2\}$ and the two receivers $\{R_{1,1}{}^1, R_{1,j}\}$ for $R_{1,j} \in \tau_1$ i.e., $$H_j = \begin{bmatrix} h_{11} & h_{12} \\ h_{j1} & h_{j2} \end{bmatrix},$$

where $h_{i1}$ denotes the channel from $S_i$ to $R_{1,1}{}^1$, along the established first route and $h_{ji}$ denotes the channel from $S_i$ to a candidate relay $R_{1,j} \in \tau_1$. Assuming that the transmit power is SNR (i.e., in a noise-dominated system, the noise power is constant, so the SNR is proportional to transmit or receive power; in other words, the noise power is unity and transmit or receive power is equal to SNR because the SNR denominator is 1 for these conditions), then $$C_{MIMO}(\{S_1,S_2\},\{R_{1,1}{}^1,R_{1,j}\}) = \log \det(I + \text{SNR } H_j H_j^H) \leq_{(a)} \log(1+(|h_{11}|^2+|h_{12}|^2)\text{SNR}) + \log(1+(|h_{j1}|^2+|h_{j2}|^2)\text{SNR})$$

where (a) follows from the Hadamard's inequality and equality is achieved if the two columns of $H_j$ are orthogonal. Thus, the obtained upper bound is maximized by choosing a relay $R_{1,j}$ to maximize $\text{SNRr}_j=(|h_{j1}|^2+|h_{j2}|^2)\text{SNR}$. $\text{SNRr}_j$ is proportional to the power of the signal received from $S_1$ and $S_2$ at the $R_{1,j}$. Thus, $\text{SNRr}_j$ can be used as an energy-harvesting routing metric approximating the MIMO capacity routing metric in the iterative method described above in relation to FIGS. 5-8. This also implies that the energy-harvesting routing tends to choose a relay such that the signal power received from the previous stage is maximized.

For interference-aware routing (based on DF), confining to nearest-neighbor transmissions maximizes the network throughput by mitigating the impact of inter-route interference. This is described in A. Ozgur, O. Leveque, and D. Tse, "Operating Regimes of Large Wireless Networks," Foundations and Trends in Networking, 2011, the entirety of which is hereby incorporated by reference as though it had been fully set forth herein. This approach, however, increases the number of hops to reach a destination, thereby yielding long end-to-end delay. For the energy-harvesting routing approach, on the other hand, longer one-hop transmission (i.e., using a higher transmit power subject to a transmit power constraint) increases the network throughput by decreasing the number of relay stages. This is due to the fact that, when relays use QMF, the throughput degrades logarithmically with the number of stages K. Thus, the energy-harvesting routing can be more suitable for the systems with a delay constraint due to a shorter end-to-end delay compared to the interference-aware routing.

The various embodiments described herein can be extended to wireless backhaul networks with multiple destinations (or aggregation nodes (AgNs)). For example, assume a scenario in which there are M aggregation nodes. A subnetwork i can be defined consisting of AgN i and the associated sources and relays for i=1, . . . , M. Each subnetwork can be established via energy-harvesting routing. Then, the proposed transmission scheme can be applied to each subnetwork separately. In this case, there exists inevitable interference caused by the relays associated with different subnetworks. Such interference can be referred to as inter-network interference. Due to the use of energy-harvesting routing, each subnetwork spans a narrow area over the entire network since in order to exploit interference, the routes are chosen as closely as possible (as described above with respect to FIGS. 4-8). For the interference-aware routing, on the other hand, each subnetwork spans a wide area over the whole network in order to avoid the inter-route interference (see description of FIG. 3 above). Therefore, the energy-harvesting routing is much more efficient in avoiding the inter-network interference than the interference-aware routing. When using the proposed scheme for multiple destination (i.e., AgNs), the energy-harvesting routing further improves the performance compared with the interference-aware routing.

In certain embodiments, energy-harvesting routing can be used to establish each subnetwork and the interference-aware routing can be used to avoid inter-network interference. For example, in some cases one subnetwork is established at a time while keeping other previously established subnetworks fixed, and repeats the process until little or no improvements in the sum throughput can be made. For the fixed subnetworks i for i∈{1, ..., M}\{j}, a subnetwork j can be established as follows. Interference-aware routing is performed to establish the first route of a subnetwork j, where each link-capacity on the route is computed by taking into account interference from all other subnetworks. Given the first route, energy-harvesting routing can be performed to establish the subnetwork j.

Routes that roots from different sources may in general have different numbers of hops due to the various source-destination distances. Such a network is referred to as an asymmetric layered network. In certain embodiments, this issue can be minimized by grouping the sources that are closely located and serving them simultaneously, which can be viewed as user scheduling. Furthermore, this approach can maximize the energy-harvesting gain since it is likely to produce a path such that the relays in each stage are closely located and hence each relay (using QMF) can collect more broadcasted energy.

Although routes can have different number of hops, the proposed scheme of energy-harvesting routing can be applied to such asymmetric layered networks. The consequence of having some routes shorter than the others will be that the relay stages will contain a different number of relays. The details are described in "A Novel Cooperative Strategy for Wireless Multihop Backhaul Networks", included in U.S. Provisional Application 62/148,050 filed Apr. 15, 2015 and incorporated by reference in its entirety above.

Figure 9:
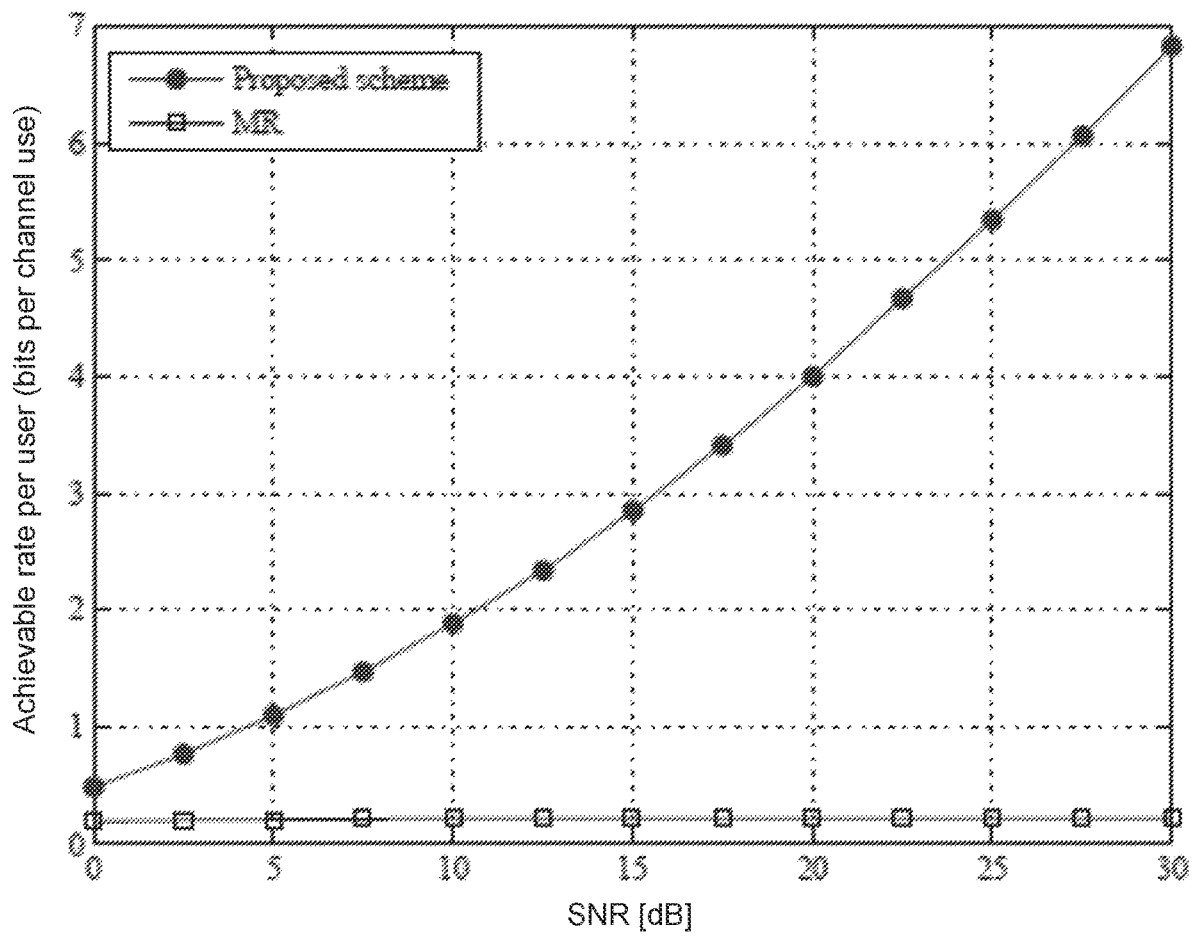
FIG. 9 illustrates a performance comparison of energy-harvesting routing and interference-aware routing for three relay stages and 4 data sources, in accordance with certain embodiments.
Figure 10:
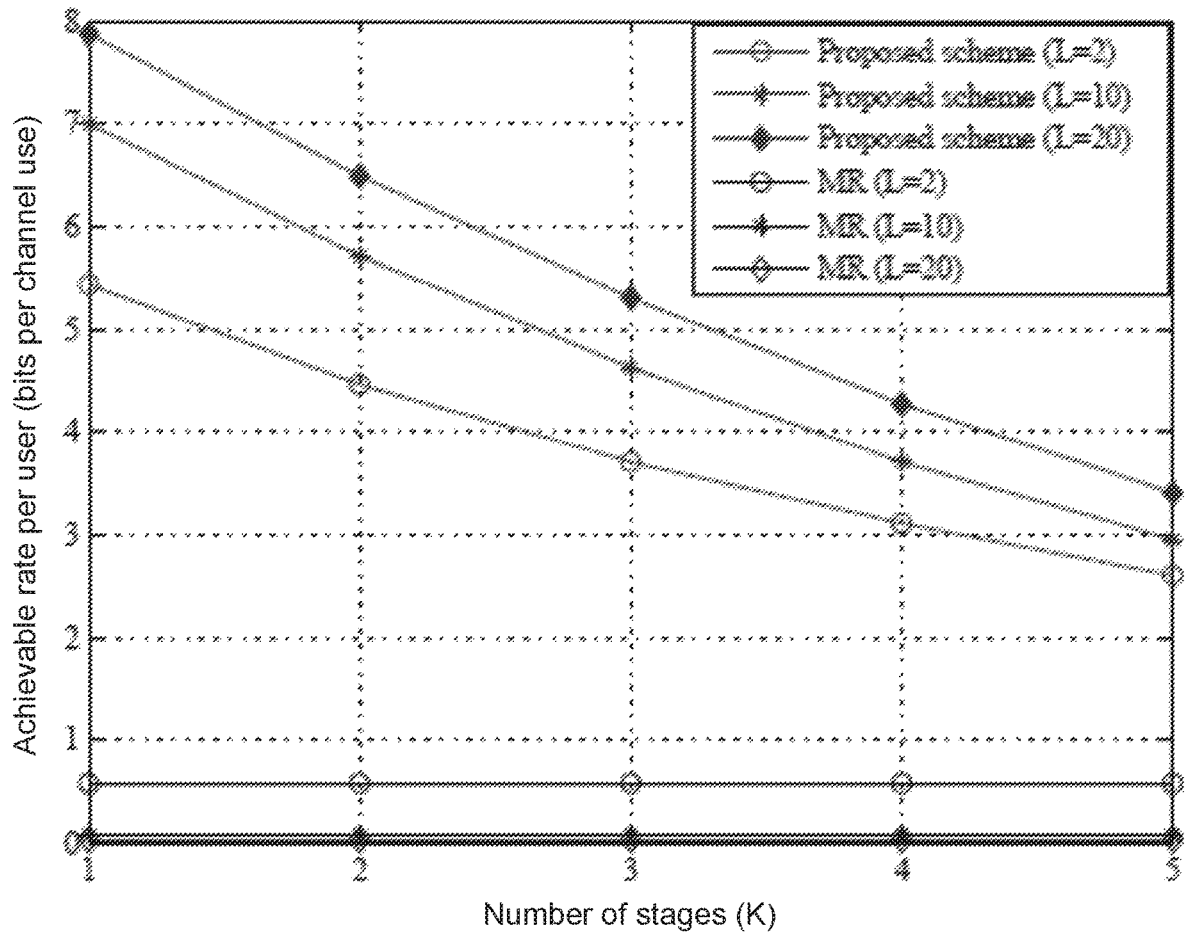
FIG. 10 illustrates a performance comparison of energy-harvesting routing and interference-aware routing for signal-to-noise ratio of 20 dB, in accordance with certain embodiments.

The various embodiments described herein can substantially improve the data throughput over the conventional (single-route) routing solution. FIGS. 9 and 10 illustrate performance comparisons between energy-harvesting routing and interference-aware routing that were obtained via simulation. As can be seen from FIGS. 9 and 10, significant performance gains can be achieved with the various embodiments described herein.

FIG. 9 illustrates a performance comparison of energy-harvesting routing and interference-aware routing for three relay stages and four data sources; in accordance with certain embodiments. More particularly, FIG. 9 illustrates the achievable rate per user (bits per channel use) for SNR [dB] for the proposed scheme (i.e., energy-harvesting routing) and multi-hop routing (MR). As can be seen from FIG. 9, energy-harvesting routing outperforms MR and has a larger performance gain as SNR increases. This is because the strong interference limits the performance of the MR while it further improves the performance of the proposed scheme.

FIG. 10 illustrates a performance comparison of energy-harvesting routing and interference-aware routing for signal-to-noise ratio of 20 dB, in accordance with certain embodiments. More particularly, FIG. 10 illustrates the achievable rate per user (bits per channel use) for the number of relay stages (K) for the proposed scheme and MR for a number of scenarios involving different numbers of data sources (i.e., users) L. Specifically, FIG. 10 illustrates the achievable rate per user for scenarios having 2 data sources, 10 data sources, and 20 data sources. From FIG. 10, it can be seen that in contrast to the MR, the performance of the proposed scheme is improved as the number of users L increases.

Figure 11B:
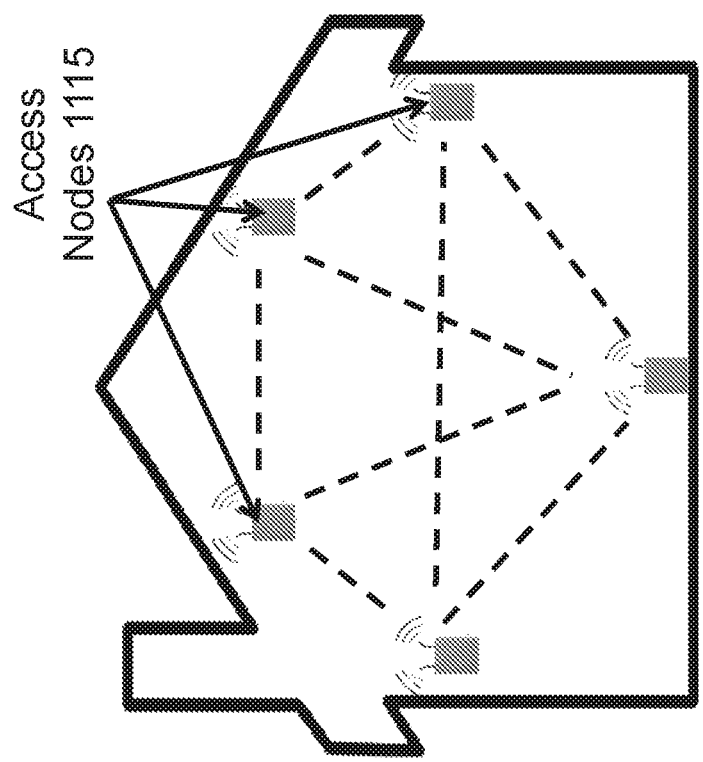
FIGS. 11A and 11B illustrate two example use cases of energy-harvesting routing, in accordance with certain embodiments.
Figure 11A:
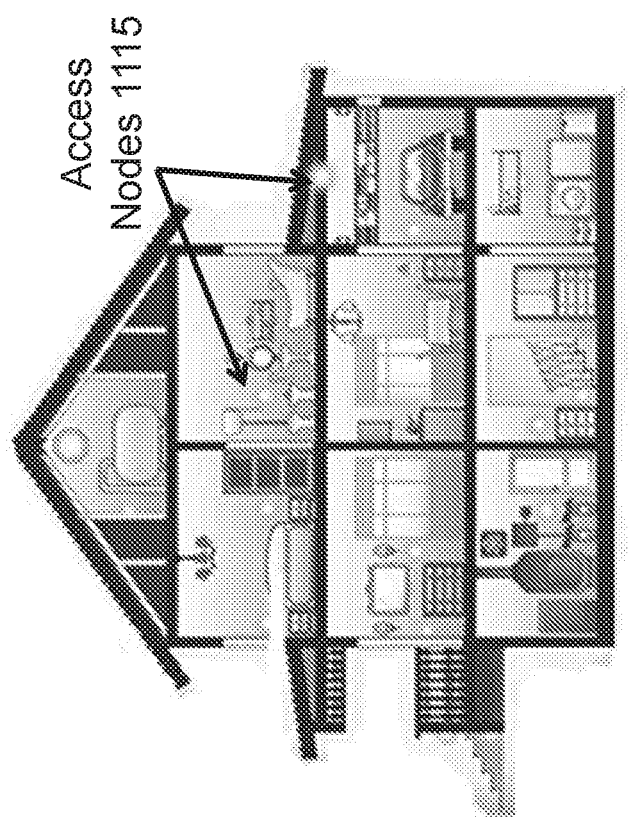

FIGS. 11A and 11B illustrate two example use cases for energy-harvesting routing, in accordance with certain embodiments. More particularly, FIG. 11A illustrates an indoors scenario (for example, inside a home) having a plurality of access nodes 1115. Similarly, FIG. 11B illustrates another indoors scenario (for example, inside a home) having a plurality of access nodes 1115 forming a wireless backhaul (mesh network). In certain embodiments, the plurality of access nodes 1115 may serve as relay nodes. Using the methods described above with respect to FIGS. 1-10 and below with respect to FIG. 13, routes from one or more sources to one or more destinations (e.g., an aggregation node such as destination 510 described above in relation to FIGS. 5-8) may be established using access nodes 1115 as relay nodes selected to maximize an energy-harvesting routing metric.

Figure 12:
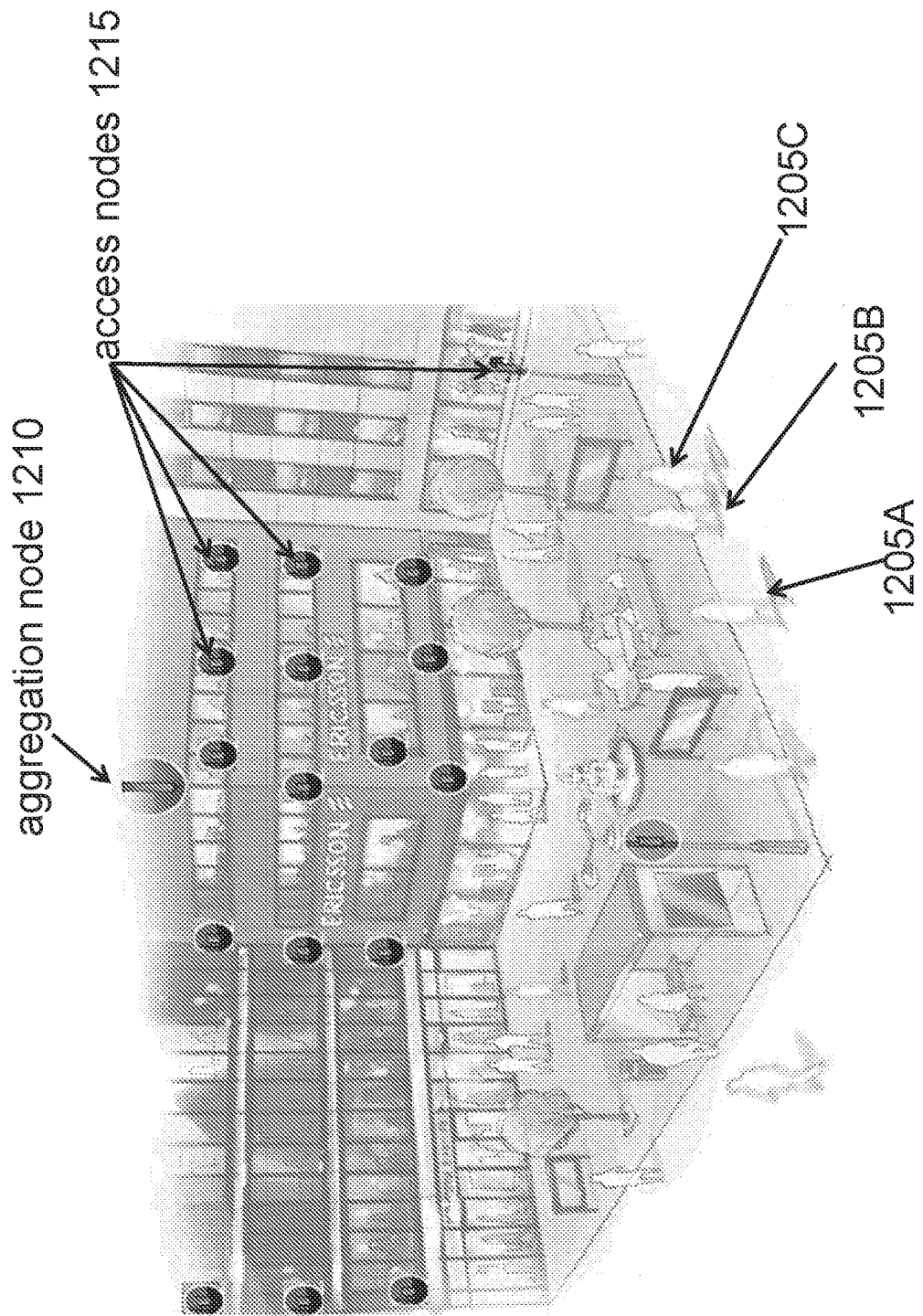
FIG. 12 illustrates a third example use case of energy-harvesting routing, in accordance with certain embodiments.

FIG. 12 illustrates a third example use case of energy-harvesting routing, in accordance with certain embodiments. More particularly, FIG. 12 illustrates an outdoor wireless backhaul (mesh) network having a plurality of sources (i.e., users) 1205, one or more destinations (i.e., aggregation nodes) 1210, and a plurality of access nodes 1215 that can serve as relay nodes. Using the methods described above with respect to FIGS. 1-10 and below with respect to FIG. 13, routes from one or more sources 1205 to one or more destinations 1210 (e.g., an aggregation node) may be established using access nodes 1215 as relay nodes selected to maximize an energy-harvesting routing metric.

To illustrate, assume that users 1205A and 1205B have data to transmit to aggregation node (i.e., destination) 1210. Using the various embodiments described herein, a first route may be determined from a first source node 1205A to aggregation node 1210. The first route may include one or more access nodes 1215 acting as relay nodes. In some cases, the determined first route may be a route having a shortest number of hops between first source node 1205A and aggregation node 1210. An energy-harvesting routing metric may be determined for use in determining a second route from a second source node 1205B to aggregation node 1210. A second route from second source node 1205B to aggregation node 1210 is then determined. The determined second route includes one or more relay nodes 1215 selected to maximize the determined energy-harvesting routing metric.

The determined first route from source node 1205A to aggregation node 1210 may then be optimized based on the determined second route from source node 1205B to aggregation node 1210 to maximize the energy-harvesting routing metric. The determined second route from source node 1205B to aggregation node 1210 may then be optimized based on the optimized first route to maximize the energy-harvesting routing metric. This process may be repeated, continuing to optimize the determined first and second routes until the energy-harvesting routing metric for both the first and second routes exceeds a threshold value.

Figure 13:
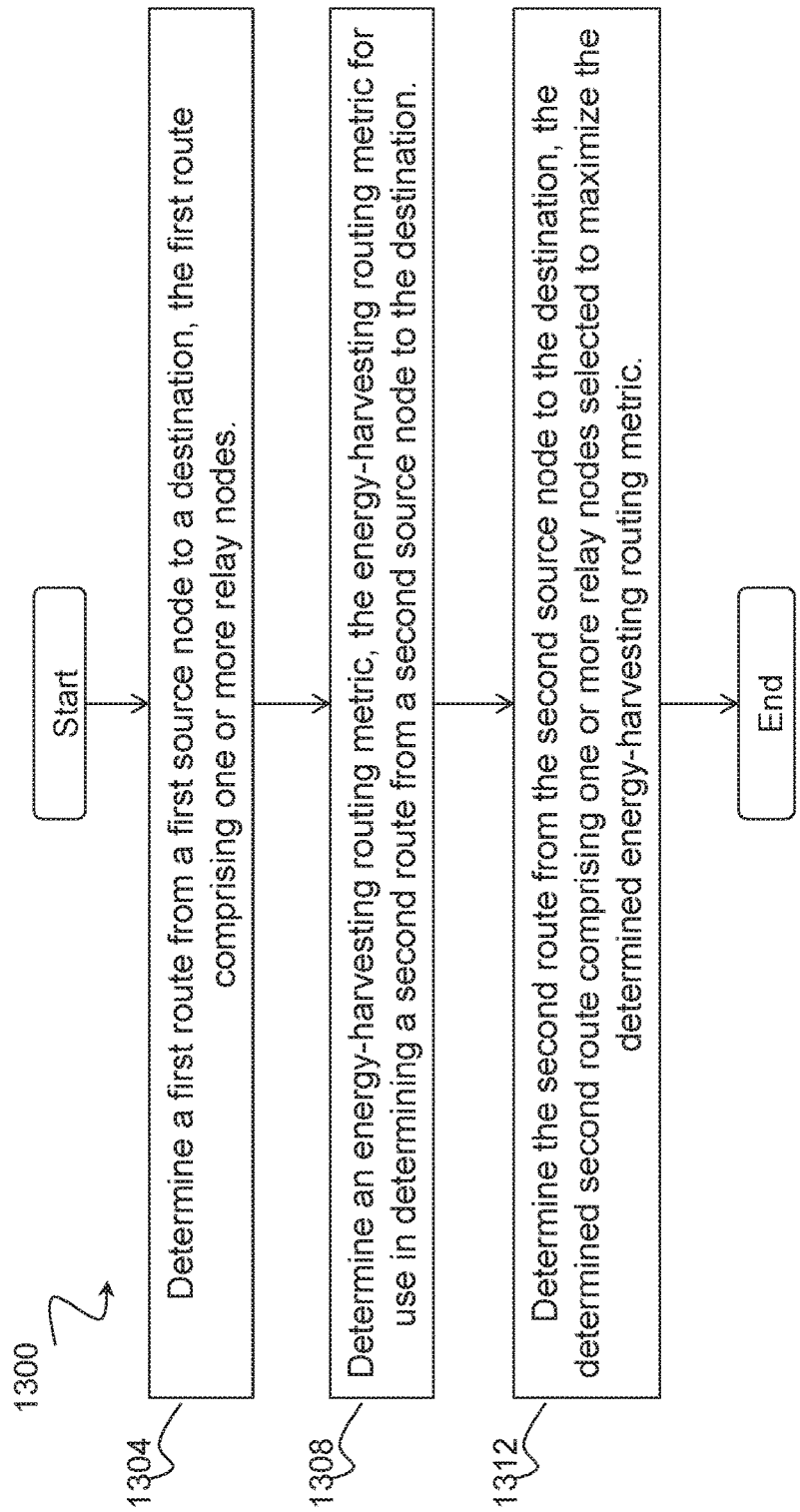
FIG. 13 illustrates a method in a node, in accordance with certain embodiments.

FIG. 13 illustrates a method in a node 1300, in accordance with certain embodiments. The method begins at step 1304, where the node determines a first route from a first source node to a destination, the first route comprising one or more relay nodes. In certain embodiments, the determined first route may comprise a route having a shortest number of hops between the first source node and the destination. In certain embodiments, the relay nodes perform noisy network coding.

At step 1308, the node determines an energy-harvesting routing metric, the energy-harvesting routing metric for use in determining a second route from a second source node to the destination. In certain embodiments, the energy-harvesting routing metric may be a multiple input multiple output (MIMO) channel capacity. In certain embodiments, the energy-harvesting routing metric may be a function of signal-to-noise ratios. The energy-harvesting metric may be determined to maximize interference between routes.

At step 1312, the node determines the second route from the second source node to the destination, the determined second route comprising one or more relay nodes selected to maximize the determined energy-harvesting routing metric. In certain embodiments, maximizing the energy-harvesting routing metric may comprise maximizing an achievable rate between consecutive relay nodes. Determining the second route from the second source node to the destination may comprise: determining one or more first candidate relay nodes, the first candidate relay nodes located within a communication range of the second source node; determining which of the one or more first candidate relay nodes maximizes the energy-harvesting routing metric, wherein the determination of which of the one or more first candidate relay nodes maximizes the energy-harvesting routing metric is based on energy-harvesting routing metrics of the first source node, the second source node, and a first relay node of the first route; and selecting a first candidate relay node that maximizes the energy-harvesting routing metric as the first relay node of the second route.

In certain embodiments, the first route and the second route may comprise different numbers of relay nodes. In certain embodiments, the method may further comprise determining one or more second candidate relay nodes, the second candidate relay nodes located within a communication range of the selected first relay node of the second route. The method may comprise determining which of the one or more second candidate relay nodes maximizes the energy-harvesting routing metric, wherein the determination of which of the one or more second candidate relay nodes maximizes the energy-harvesting routing metric is based on energy-harvesting routing metrics of the first relay node of the first route, the first relay node of the second route, and a second relay node of the first route. The method may comprise selecting a second candidate relay node that maximizes the energy-harvesting routing metric as the second relay node of the second route.

In certain embodiments, the method may comprise optimizing the determined first route based on the determined second route, the second route comprising one or more relay nodes selected according to the determined energy-harvesting routing metric, wherein the optimized first route maximizes the energy-harvesting routing metric. Optimizing the determined first route based on the determined second route may comprise: determining one or more third candidate relay nodes, the third candidate relay nodes located within a communication range of the first source node; determining which of the one or more third candidate relay nodes maximizes the energy-harvesting routing metric, wherein the determination of which of the one or more third candidate relay nodes maximizes the energy-harvesting routing metric is based on the energy-harvesting routing metric of the first source node, the second source node, and a first relay node of the second route; and selecting a third candidate relay node that maximizes the energy-harvesting routing metric as a new first relay node of the first route.

In certain embodiments, the method may comprise determining one or more fourth candidate relay nodes, the fourth candidate relay nodes located within a communication range of the new first relay node of the first route; determining which of the one or more fourth candidate relay nodes maximizes the energy-harvesting routing metric, wherein the determination of which of the one or more fourth candidate relay nodes maximizes the energy-harvesting routing metric is based on the energy-harvesting routing metric of the new first relay node of the first route, the first relay node of the second route, and the second relay node of the second route; and selecting a fourth candidate relay node that maximizes the energy-harvesting routing metric as a new second relay node of the first route.

In certain embodiments, the method may comprise optimizing the determined second route based on the optimized first route, wherein the optimized second route maximizes the energy-harvesting routing metric. The method may comprise continuing to optimize the determined first and second routes until the energy-harvesting routing metric for both the first and second routes exceeds a threshold value.

In certain embodiments, the method may comprise defining a plurality of subnetworks, the defined plurality of subnetworks comprising at least a first subnetwork comprising the destination and the first and second source nodes and a second subnetwork comprising a second destination and a plurality of source nodes associated with the second destination, the plurality of source nodes including at least one additional source node. The method may comprise determining a first route for the second subnetwork from one of the plurality of source nodes associated with the second destination to the second destination, the first route for the second subnetwork comprising one or more relay nodes. In certain embodiments, the first route for the second subnetwork may be determined using interference-aware routing. The method may comprise determining a second route for the second subnetwork from another of the plurality of source nodes associated with the second destination to the second destination, the determined second route for the second subnetwork comprising one or more relay nodes selected to maximize the determined energy-harvesting routing metric. The method may comprise optimizing the determined first route for the second subnetwork based on the determined second route for the second subnetwork, the second route for the second subnetwork comprising one or more relay nodes selected according to the determined energy-harvesting routing metric, wherein the optimized first route for the second subnetwork maximizes the energy-harvesting routing metric.

Figure 14:
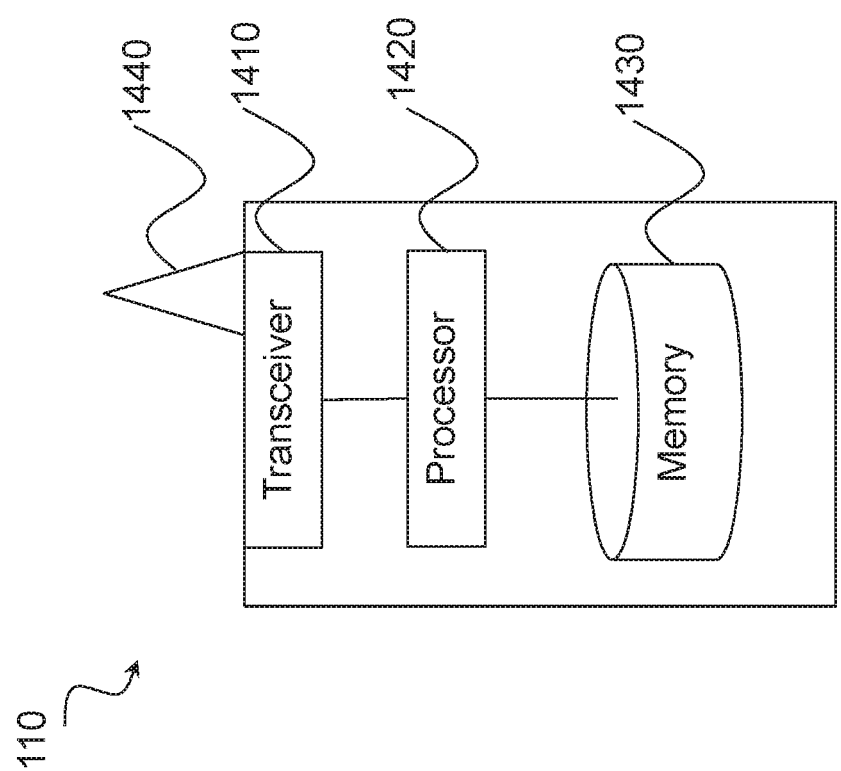
FIG. 14 is a block schematic of an exemplary wireless device, in accordance with certain embodiments.

FIG. 14 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1410, processor 1420, and memory 1430. In some embodiments, transceiver 1410 facilitates transmitting wireless signals to and receiving wireless signals from network node 115 (e.g., via antenna 1440), processor 1420 executes instructions to provide some or all of the functionality described above as being provided by wireless device 110, and memory 1430 stores the instructions executed by processor 1420. In some embodiments, wireless device 110 may optionally comprise a satellite positioning system (e.g. GPS) receiver that can be used to determine the position and speed of movement of the wireless device 110.

Processor 1420 may include any suitable combination of hardware and software implemented in one or more modules to execute instructions and manipulate data to perform some or all of the described functions of wireless device 110, such as the functions of wireless device 110 described above in relation to FIGS. 1-13. In some embodiments, processor 1420 may include, for example, one or more computers, one or more central processing units (CPUs), one or more microprocessors, one or more applications, one or more application specific integrated circuits (ASICs), one or more field programmable gate arrays (FPGAs) and/or other logic. To make use of discontinuous reception (DRX), processor 1420 can be configured to deactivate transceiver 1410 for specified lengths of time.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1420.

A wireless device 110 may store and transmit (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such devices include hardware such as a set of one or more processors (e.g., processor 1420) coupled to one or more other components, such as one or more non-transitory machine-readable media (to store code and/or data) (e.g., memory 1430), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given wireless device 110 typically stores instructions for execution on one or more processors of that wireless device. One or more parts of an embodiment described herein may be implemented using different combinations of software, firmware, and/or hardware.

Other embodiments of wireless device 110 may include additional components beyond those shown in FIG. 14 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 1420. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 15:
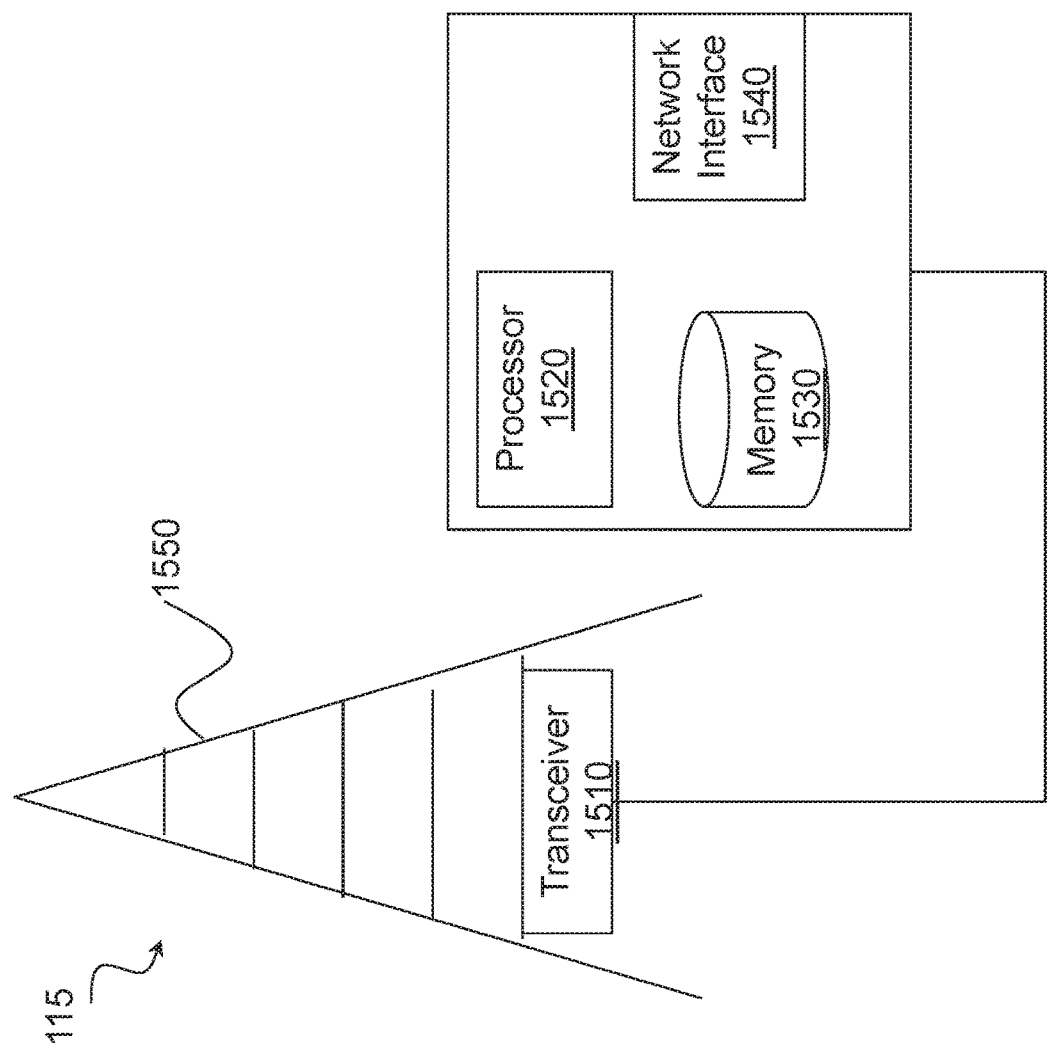
FIG. 15 is a block schematic of an exemplary network node, in accordance with certain embodiments.

FIG. 15 is a block schematic of an exemplary network node, in accordance with certain embodiments. Network node 115 may be any type of radio network node or any network node that communicates with a UE and/or with another network node. Examples of network node 115 include an eNodeB (e.g., a macro eNB or a micro eNB), a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, a router, a switch, a bridge, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions. It will be appreciated that although a macro eNB will not in practice be identical in size and structure to a micro eNB, for the purposes of illustration, the base stations 115 are assumed to include similar components.

Network node 115 may include one or more of transceiver 1510, processor 1520, memory 1530, and network interface 1540. In some embodiments, transceiver 1510 facilitates transmitting wireless signals to and receiving wireless signals from wireless device 110 (e.g., via antenna 1550), processor 1520 executes instructions to provide some or all of the functionality described above as being provided by a network node 115, memory 1530 stores the instructions executed by processor 1520, and network interface 1540 communicates signals to backend network components, such as a gateway, switch, router, Internet, Public Switched Telephone Network (PSTN), core network nodes or radio network controllers 130, etc.

Processor 1520 may include any suitable combination of hardware and software implemented in one or more modules to execute instructions and manipulate data to perform some or all of the described functions of network node 115, such as those described above in relation to FIGS. 1-13 above. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processor 1520 and may refer to any suitable device operable to receive input for network node 115, send output from network node 115, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network. In certain embodiments, network interface 1540 may also include components and/or circuitry (such as an eNodeB interface) for allowing network node 115 to exchange information with other network nodes 115 (for example via an X2 interface) and components and/or circuitry (such as a core network interface) for allowing network node 115 to exchange information with nodes in the core network (for example via the S1 interface).

In certain embodiments, network node 115 may be referred to as a network device or apparatus. A network device or apparatus (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station or other network apparatus can perform the functions described herein.

Other embodiments of network node 115 may include additional components beyond those shown in FIG. 15 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. For example, network nodes 115 for use in other types of network (e.g., UTRAN or WCDMA RAN) will include similar components to those shown in FIG. 15 and appropriate interface circuitry for enabling communications with the other network nodes in those types of networks (e.g., other network nodes (such as base stations), mobility management nodes and/or nodes in the core network).

Figure 16:
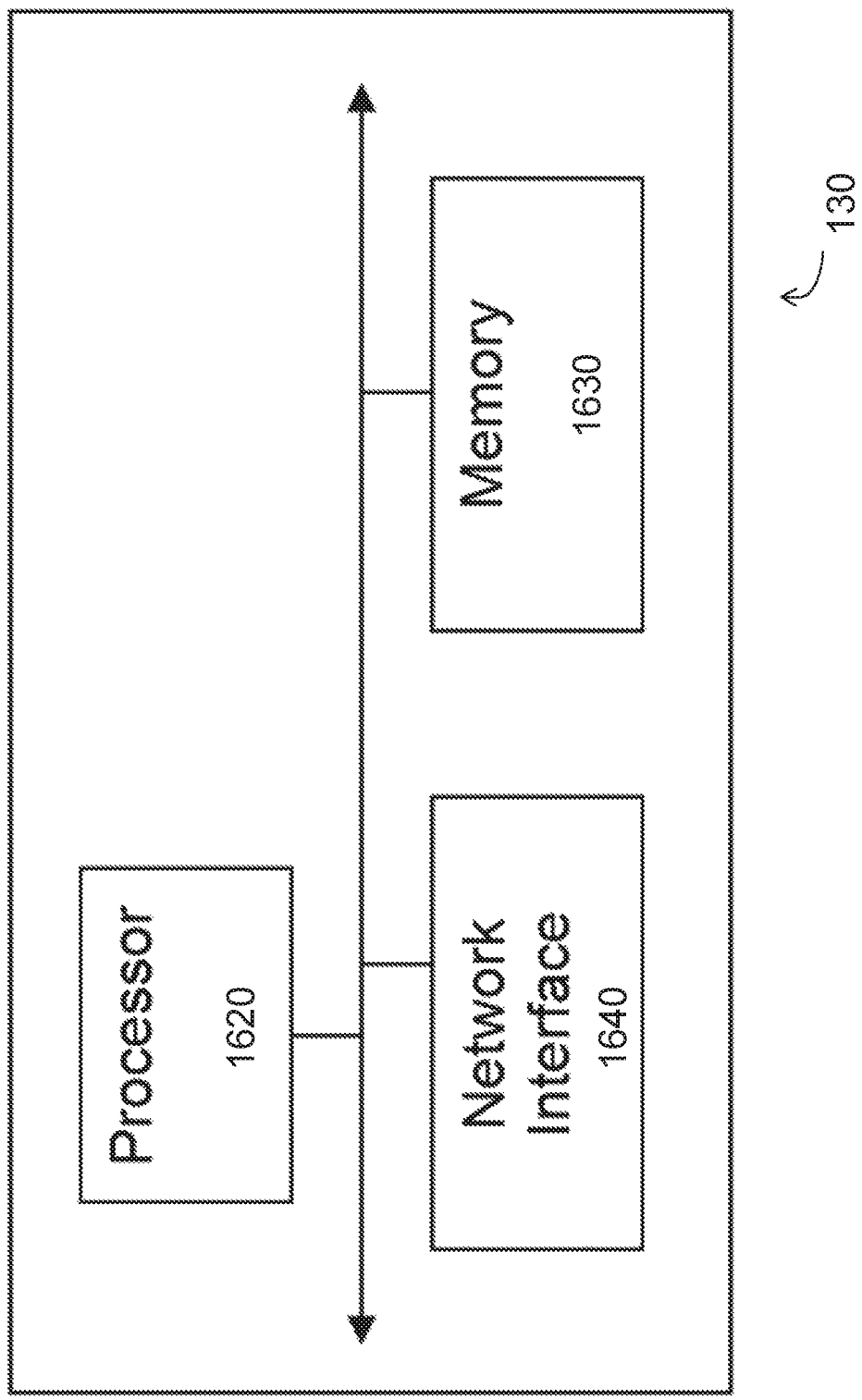
FIG. 16 is a block schematic of an exemplary radio network controller or core network node, in accordance with certain embodiments.

FIG. 16 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1620, memory 1630, and network interface 1640. In some embodiments, processor 1620 executes instructions to provide some or all of the functionality described above as being provided by the network node, memory 1630 stores the instructions executed by processor 1620, and network interface 1640 communicates signals to any suitable node, such as a gateway, switch, router, Internet, Public Switched Telephone Network (PSTN), network nodes 115, radio network controllers or core network nodes 130, etc.

Processor 1620 may include any suitable combination of hardware and software implemented in one or more modules to execute instructions and manipulate data to perform some or all of the described functions of the radio network controller or core network node 130. In some embodiments, processor 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 1640 is communicatively coupled to processor 1620 and may refer to any suitable device operable to receive input for the network node, send output from the network node, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of the network node may include additional components beyond those shown in FIG. 16 that may be responsible for providing certain aspects of the network node's functionality, including any of the functionality described above and/or any additional functionality (including any functionality necessary to support the solution described above).

Figure 17:
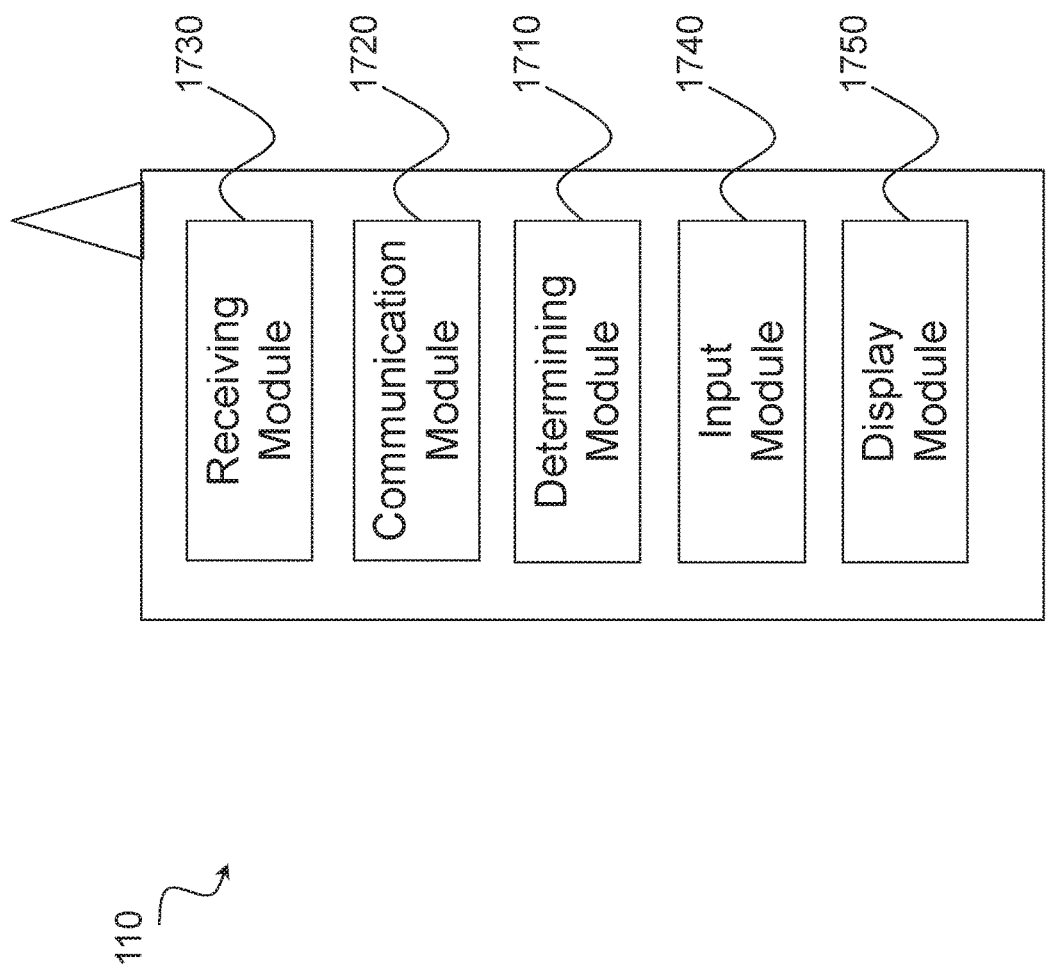
FIG. 17 is a block schematic of an exemplary wireless device, in accordance with certain embodiments.

FIG. 17 is a block schematic of an exemplary wireless device, in accordance with certain embodiments. Wireless device 110 may include one or more modules. For example, wireless device 110 may include a determining module 1710, a communication module 1720, a receiving module 1730, an input module 1740, a display module 1750, and any other suitable modules. Wireless device 110 may perform the energy-harvesting routing methods described above with respect to FIGS. 1-13.

Determining module 1710 may perform the processing functions of wireless device 110. For example, determining module 1710 may determine a first route from a first source node to a destination, the first route comprising one or more relay nodes. As another example, determining module 1710 may determine an energy-harvesting routing metric, the energy-harvesting routing metric for use in determining a second route from a second source node to the destination. As still another example, determining module 1710 may determine the second route from the second source node to the destination, the determined second route comprising one or more relay nodes selected to maximize the determined energy-harvesting routing metric.

In some cases, determining module 1710 may determine the second route from the second source node to the destination by: determining one or more first candidate relay nodes, the first candidate relay nodes located within a communication range of the second source node; determining which of the one or more first candidate relay nodes maximizes the energy-harvesting routing metric, wherein the determination of which of the one or more first candidate relay nodes maximizes the energy-harvesting routing metric is based on energy-harvesting routing metrics of the first source node, the second source node, and a first relay node of the first route; and selecting a first candidate relay node that maximizes the energy-harvesting routing metric as the first relay node of the second route.

As yet another example, determining module 1710 may: determine one or more second candidate relay nodes, the second candidate relay nodes located within a communication range of the selected first relay node of the second route; determine which of the one or more second candidate relay nodes maximizes the energy-harvesting routing metric, wherein the determination of which of the one or more second candidate relay nodes maximizes the energy-harvesting routing metric is based on energy-harvesting routing metrics of the first relay node of the first route, the first relay node of the second route, and a second relay node of the first route; and select a second candidate relay node that maximizes the energy-harvesting routing metric as the second relay node of the second route.

As another example, determining module 1710 may optimize the determined first route based on the determined second route, the second route comprising one or more relay nodes selected according to the determined energy-harvesting routing metric, wherein the optimized first route maximizes the energy-harvesting routing metric. In some cases, determining module 1710 may optimize the determined first route based on the determined second route by determining one or more third candidate relay nodes, the third candidate relay nodes located within a communication range of the first source node; determining which of the one or more third candidate relay nodes maximizes the energy-harvesting routing metric, wherein the determination of which of the one or more third candidate relay nodes maximizes the energy-harvesting routing metric is based on the energy-harvesting routing metric of the first source node, the second source node, and a first relay node of the second route; and selecting a third candidate relay node that maximizes the energy-harvesting routing metric as a new first relay node of the first route.

As another example, determining module 1710 may: determine one or more fourth candidate relay nodes, the fourth candidate relay nodes located within a communication range of the new first relay node of the first route; determine which of the one or more fourth candidate relay nodes maximizes the energy-harvesting routing metric, wherein the determination of which of the one or more fourth candidate relay nodes maximizes the energy-harvesting routing metric is based on the energy-harvesting routing metric of the new first relay node of the first route, the first relay node of the second route, and the second relay node of the second route; and select a fourth candidate relay node that maximizes the energy-harvesting routing metric as a new second relay node of the first route.

As still another example, determining module 1710 may optimize the determined second route based on the optimized first route, wherein the optimized second route maximizes the energy-harvesting routing metric. As another example, determining module 1710 may continue to optimize the determined first and second routes until the energy-harvesting routing metric for both the first and second routes exceeds a threshold value.

As yet another example, determining module 1710 may: define a plurality of subnetworks, the defined plurality of subnetworks comprising at least a first subnetwork comprising the destination and the first and second source nodes and a second subnetwork comprising a second destination and a plurality of source nodes associated with the second destination, the plurality of source nodes including at least one additional source node; determine a first route for the second subnetwork from one of the plurality of source nodes associated with the second destination to the second destination, the first route for the second subnetwork comprising one or more relay nodes; determine a second route for the second subnetwork from another of the plurality of source nodes associated with the second destination to the second destination, the determined second route for the second subnetwork comprising one or more relay nodes selected to maximize the determined energy-harvesting routing metric; and optimize the determined first route for the second subnetwork based on the determined second route for the second subnetwork, the second route for the second subnetwork comprising one or more relay nodes selected according to the determined energy-harvesting routing metric, wherein the optimized first route for the second subnetwork maximizes the energy-harvesting routing metric.

Determining module 1710 may include or be included in one or more processors, such as processor 1420 described above in relation to FIG. 14. Determining module 1710 may include analog and/or digital circuitry configured to perform any of the functions of determining module 1710 and/or processor 1420 described above. The functions of determining module 1710 described above may, in certain embodiments, be performed in one or more distinct modules.

Communication module 1720 may perform the transmission functions of wireless device 110. Communication module 1720 may transmit messages to one or more of network nodes 115 of network 100. Communication module 1720 may include a transmitter and/or a transceiver, such as transceiver 1410 described above in relation to FIG. 14. Communication module 1720 may include circuitry configured to wirelessly transmit messages and/or signals. In particular embodiments, communication module 1720 may receive messages and/or signals for transmission from determining module 1710. In certain embodiments, the functions of communication module 1720 described above may be performed in one or more distinct modules.

Receiving module 1730 may perform the receiving functions of wireless device 110. Receiving module 1730 may include a receiver and/or a transceiver, such as transceiver 1410 described above in relation to FIG. 14. Receiving module 1730 may include circuitry configured to wirelessly receive messages and/or signals. In particular embodiments, receiving module 1730 may communicate received messages and/or signals to determining module 1710.

Input module 1740 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1710.

Display module 1750 may present signals on a display of wireless device 110. Display module 1750 may include the display and/or any appropriate circuitry and hardware configured to present signals on the display. Display module 1750 may receive signals to present on the display from determining module 1710.

Determining module 1710, communication module 1720, receiving module 1730, input module 1740, and display module 1750 may include any suitable configuration of hardware and/or software. Wireless device 110 may include additional modules beyond those shown in FIG. 17 that may be responsible for providing any suitable functionality, including any of the functionality described above and/or any additional functionality (including any functionality necessary to support the various solutions described herein).

Figure 18:
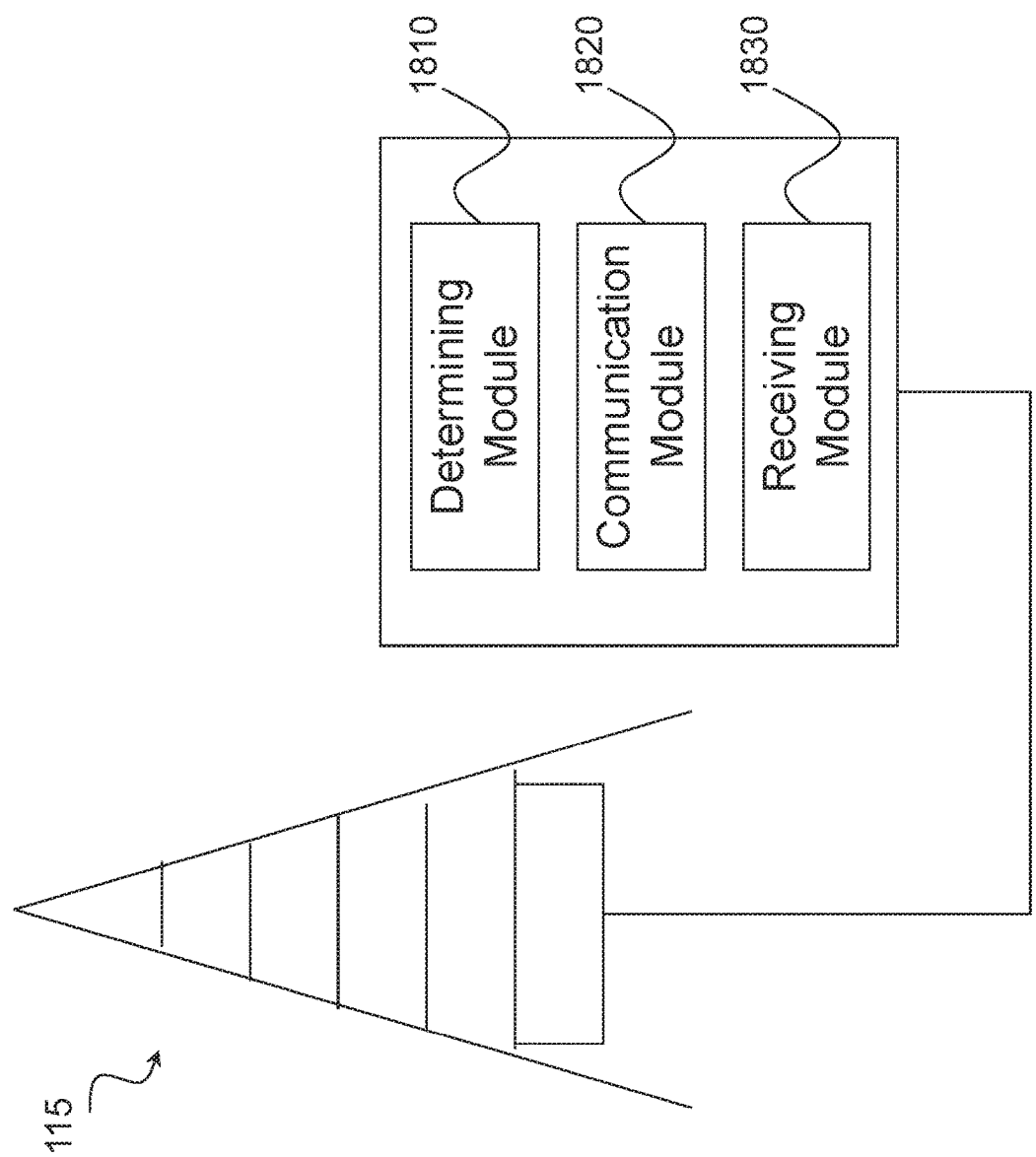
FIG. 18 is a block schematic of an exemplary network node, in accordance with certain embodiments.

FIG. 18 is a block schematic of an exemplary network node 115, in accordance with certain embodiments. Network node 115 may include one or more modules. For example, network node 115 may include determining module 1810, communication module 1820, receiving module 1830, and any other suitable modules. In some embodiments, one or more of determining module 1810, communication module 1820, receiving module 1830, or any other suitable module may be implemented using one or more processors, such as processor 1520 described above in relation to FIG. 15. In certain embodiments, the functions of two or more of the various modules may be combined into a single module. Network node 115 may perform the energy-harvesting routing methods described above with respect to FIGS. 1-13.

Determining module 1810 may perform the processing functions of network node 115. For example, determining module 1810 may determine a first route from a first source node to a destination, the first route comprising one or more relay nodes. As another example, determining module 1810 may determine an energy-harvesting routing metric, the energy-harvesting routing metric for use in determining a second route from a second source node to the destination. As still another example, determining module 1810 may determine the second route from the second source node to the destination, the determined second route comprising one or more relay nodes selected to maximize the determined energy-harvesting routing metric.

In some cases, determining module 1810 may determine the second route from the second source node to the destination by: determining one or more first candidate relay nodes, the first candidate relay nodes located within a communication range of the second source node; determining which of the one or more first candidate relay nodes maximizes the energy-harvesting routing metric, wherein the determination of which of the one or more first candidate relay nodes maximizes the energy-harvesting routing metric is based on energy-harvesting routing metrics of the first source node, the second source node, and a first relay node of the first route; and selecting a first candidate relay node that maximizes the energy-harvesting routing metric as the first relay node of the second route.

As yet another example, determining module 1810 may: determine one or more second candidate relay nodes, the second candidate relay nodes located within a communication range of the selected first relay node of the second route; determine which of the one or more second candidate relay nodes maximizes the energy-harvesting routing metric, wherein the determination of which of the one or more second candidate relay nodes maximizes the energy-harvesting routing metric is based on energy-harvesting routing metrics of the first relay node of the first route, the first relay node of the second route, and a second relay node of the first route; and select a second candidate relay node that maximizes the energy-harvesting routing metric as the second relay node of the second route.

As another example, determining module 1810 may optimize the determined first route based on the determined second route, the second route comprising one or more relay nodes selected according to the determined energy-harvesting routing metric, wherein the optimized first route maximizes the energy-harvesting routing metric. In some cases, determining module 1810 may optimize the determined first route based on the determined second route by determining one or more third candidate relay nodes, the third candidate relay nodes located within a communication range of the first source node; determining which of the one or more third candidate relay nodes maximizes the energy-harvesting routing metric, wherein the determination of which of the one or more third candidate relay nodes maximizes the energy-harvesting routing metric is based on the energy-harvesting routing metric of the first source node, the second source node, and a first relay node of the second route; and selecting a third candidate relay node that maximizes the energy-harvesting routing metric as a new first relay node of the first route.

As another example, determining module 1810 may: determine one or more fourth candidate relay nodes, the fourth candidate relay nodes located within a communication range of the new first relay node of the first route; determine which of the one or more fourth candidate relay nodes maximizes the energy-harvesting routing metric, wherein the determination of which of the one or more fourth candidate relay nodes maximizes the energy-harvesting routing metric is based on the energy-harvesting routing metric of the new first relay node of the first route, the first relay node of the second route, and the second relay node of the second route; and select a fourth candidate relay node that maximizes the energy-harvesting routing metric as a new second relay node of the first route.

As still another example, determining module 1810 may optimize the determined second route based on the optimized first route, wherein the optimized second route maximizes the energy-harvesting routing metric. As another example, determining module 1810 may continue to optimize the determined first and second routes until the energy-harvesting routing metric for both the first and second routes exceeds a threshold value.

As yet another example, determining module 1810 may: define a plurality of subnetworks, the defined plurality of subnetworks comprising at least a first subnetwork comprising the destination and the first and second source nodes and a second subnetwork comprising a second destination and a plurality of source nodes associated with the second destination, the plurality of source nodes including at least one additional source node; determine a first route for the second subnetwork from one of the plurality of source nodes associated with the second destination to the second destination, the first route for the second subnetwork comprising one or more relay nodes; determine a second route for the second subnetwork from another of the plurality of source nodes associated with the second destination to the second destination, the determined second route for the second subnetwork comprising one or more relay nodes selected to maximize the determined energy-harvesting routing metric; and optimize the determined first route for the second subnetwork based on the determined second route for the second subnetwork, the second route for the second subnetwork comprising one or more relay nodes selected according to the determined energy-harvesting routing metric, wherein the optimized first route for the second subnetwork maximizes the energy-harvesting routing metric.

Determining module 1810 may include or be included in one or more processors, such as processor 1520 described above in relation to FIG. 15. Determining module 1810 may include analog and/or digital circuitry configured to perform any of the functions of determining module 1810 and/or processor 1520 described above. The functions of determining module 1810 may, in certain embodiments, be performed in one or more distinct modules.

Communication module 1820 may perform the transmission functions of network node 115. Communication module 1820 may transmit messages to one or more of wireless devices 110. Communication module 1820 may include a transmitter and/or a transceiver, such as transceiver 1510 described above in relation to FIG. 15. Communication module 1820 may include circuitry configured to wirelessly transmit messages and/or signals. In particular embodiments, communication module 1820 may receive messages and/or signals for transmission from determining module 1810 or any other module.

Receiving module 1830 may perform the receiving functions of network node 115. Receiving module 1830 may receive any suitable information from a wireless device. Receiving module 1830 may include a receiver and/or a transceiver, such as transceiver 1510 described above in relation to FIG. 15. Receiving module 1830 may include circuitry configured to wirelessly receive messages and/or signals. In particular embodiments, receiving module 1830 may communicate received messages and/or signals to determining module 1810 or any other suitable module.

Determining module 1810, communication module 1820, and receiving module 1830 may include any suitable configuration of hardware and/or software. Network node 115 may include additional modules beyond those shown in FIG. 18 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AgN Aggregation Node
AP Access Point
BS Base Station
BSC Base Station Controller
BTS Base Transceiver Station
CF Compress-and-Forward
CPE Customer Premises Equipment
D2D Device-to-Device
DAS Distributed Antenna System
DF Decode-and-Forward
eNB eNodeB
LAN Local Area Network
LME Laptop Mounted Equipment
LTE Long Term Evolution
M2M Machine-to-Machine
MAN Metropolitan Area Network
MCE Multi-cell/multicast Coordination Entity
MIMO Multiple Input Multiple Output
MSR Multi-standard Radio
MTC Machine Type Communication
NNC Noisy Network Coding
PSTN Public Switched Telephone Network
QMF Quantize-Map-Forward
RAT Radio Access Technology
RNC Radio Network Controller
RRU Remote Radio Unit
RRH Remote Radio Head
SF Store-and-Forward
SNNC Short Message NNC
SNR Signal to Noise Ratio
UE User Equipment
WAN Wide Area Network
WLAN Wireless Local Area Network

The invention claimed is:

1. A method in a node, comprising:
    determining a first route from a first source node to a destination, the first route comprising one or more relay nodes;
    determining an energy-harvesting routing metric, the energy-harvesting routing metric for use in determining a second route from a second source node to the destination;
    determining the second route from the second source node to the destination, the determined second route comprising one or more relay nodes selected to maximize the determined energy-harvesting routing metric;
    transmitting at least a portion of the second route to one or more of the second source node and the one or more relay nodes for use by the second source node to transmit data to the destination; and
    wherein determining the second route from the second source node to the destination comprises:
        determining one or more first candidate relay nodes, the first candidate relay nodes located within a communication range of the second source node;

determining which of the one or more first candidate relay nodes maximizes the energy-harvesting routing metric, wherein the determination of which of the one or more first candidate relay nodes maximizes the energy-harvesting routing metric is based on an energy-harvesting routing metric of the first source node, the second source node, and a first relay node of the first route; and selecting a first candidate relay node that maximizes the energy-harvesting routing metric as the first relay node of the second route.

2. The method of claim 1, wherein the determined first route comprises a route having a shortest number of hops between the first source node and the destination.

3. The method of claim 1, comprising:
determining one or more second candidate relay nodes, the second candidate relay nodes located within a communication range of the selected first relay node of the second route;
determining which of the one or more second candidate relay nodes maximizes the energy-harvesting routing metric, wherein the determination of which of the one or more second candidate relay nodes maximizes the energy-harvesting routing metric is based on an energy-harvesting routing metric of the first relay node of the first route, the first relay node of the second route, and a second relay node of the first route; and
selecting a second candidate relay node that maximizes the energy-harvesting routing metric as the second relay node of the second route.

4. The method of claim 1, comprising:
optimizing the determined first route based on the determined second route, the second route comprising one or more relay nodes selected according to the determined energy-harvesting routing metric, wherein the optimized first route maximizes the energy-harvesting routing metric.

5. The method of claim 4, wherein optimizing the determined first route based on the determined second route comprises:
determining one or more third candidate relay nodes, the third candidate relay nodes located within a communication range of the first source node;
determining which of the one or more third candidate relay nodes maximizes the energy-harvesting routing metric, wherein the determination of which of the one or more third candidate relay nodes maximizes the energy-harvesting routing metric is based on an energy-harvesting routing metric of the first source node, the second source node, and a first relay node of the second route; and
selecting a third candidate relay node that maximizes the energy-harvesting routing metric as a new first relay node of the first route.

6. The method of claim 5, comprising:
determining one or more fourth candidate relay nodes, the fourth candidate relay nodes located within a communication range of the new first relay node of the first route;
determining which of the one or more fourth candidate relay nodes maximizes the energy-harvesting routing metric, wherein the determination of which of the one or more fourth candidate relay nodes maximizes the energy-harvesting routing metric is based on an energy-harvesting routing metric of the new first relay node of the first route, the first relay node of the second route, and the second relay node of the second route; and selecting a fourth candidate relay node that maximizes the energy-harvesting routing metric as a new second relay node of the first route.

7. The method of claim 4, comprising:
optimizing the determined second route based on the optimized first route, wherein the optimized second route maximizes the energy-harvesting routing metric.

8. The method of claim 7, comprising:
continuing to optimize the determined first and second routes until the energy-harvesting routing metric for both the first and second routes exceeds a threshold value.

9. The method of claim 1, wherein maximizing the energy-harvesting routing metric comprises maximizing an achievable rate between consecutive relay nodes.

10. The method of claim 1, wherein the energy-harvesting routing metric comprises a multiple input multiple output (MIMO) channel capacity.

11. The method of claim 1, wherein the energy-harvesting routing metric is a function of a signal-to-noise ratio.

12. The method of claim 1, wherein maximizing the energy-harvesting routing metric comprises maximizing interference between routes.

13. The method of claim 1, wherein the relay nodes perform noisy network coding.

14. The method of claim 1, comprising:
defining a plurality of subnetworks, the defined plurality of subnetworks comprising at least a first subnetwork comprising the destination and the first and second source nodes and a second subnetwork comprising a second destination and a plurality of source nodes associated with the second destination, the plurality of source nodes including at least one additional source node;
determining a first route for the second subnetwork from one of the plurality of source nodes associated with the second destination to the second destination, the first route for the second subnetwork comprising one or more relay nodes;
determining a second route for the second subnetwork from another of the plurality of source nodes associated with the second destination to the second destination, the determined second route for the second subnetwork comprising one or more relay nodes selected to maximize the determined energy-harvesting routing metric; and
optimizing the determined first route for the second subnetwork based on the determined second route for the second subnetwork, the second route for the second subnetwork comprising one or more relay nodes selected according to the determined energy-harvesting routing metric, wherein the optimized first route for the second subnetwork maximizes the energy-harvesting routing metric.

15. The method of claim 14, wherein the first route for the second subnetwork is determined using interference-aware routing.

16. The method of claim 1, wherein the first route and the second route comprise different numbers of relay nodes.

17. A node, comprising:
one or more processors, the one or more processors configured to:
determine a first route from a first source node to a destination, the first route comprising one or more relay nodes;

determine an energy-harvesting routing metric, the energy-harvesting routing metric for use in determining a second route from a second source node to the destination;

determine the second route from the second source node to the destination, the determined second route comprising one or more relay nodes selected to maximize the determined energy-harvesting routing metric;

transmit at least a portion of the second route to one or more of the second source node and the one or more relay nodes for use by the second source node to transmit data to the destination; and wherein the one or more processors configured to determine the second route from the second source node to the destination comprise one or more processors configured to:

determine one or more first candidate relay nodes, the first candidate relay nodes located within a communication range of the second source node;

determine which of the one or more first candidate relay nodes maximizes the energy-harvesting routing metric, wherein the determination of which of the one or more first candidate relay nodes maximizes the energy-harvesting routing metric is based on an energy-harvesting routing metric of the first source node, the second source node, and a first relay node of the first route; and select a first candidate relay node that maximizes the energy-harvesting routing metric as the first relay node of the second route.

18. The node of claim 17, wherein the determined first route comprises a route having a shortest number of hops between the first source node and the destination.

19. The node of claim 17, wherein the one or more processors are further configured to:

determine one or more second candidate relay nodes, the second candidate relay nodes located within a communication range of the selected first relay node of the second route;

determine which of the one or more second candidate relay nodes maximizes the energy-harvesting routing metric, wherein the determination of which of the one or more second candidate relay nodes maximizes the energy-harvesting routing metric is based on an energy-harvesting routing metric of the first relay node of the first route, the first relay node of the second route, and a second relay node of the first route; and select a second candidate relay node that maximizes the energy-harvesting routing metric as the second relay node of the second route.

20. The node of claim 17, wherein the one or more processors are further configured to:

optimize the determined first route based on the determined second route, the second route comprising one or more relay nodes selected according to the determined energy-harvesting routing metric, wherein the optimized first route maximizes the energy-harvesting routing metric.

21. The node of claim 20, wherein the one or more processors configured to optimize the determined first route based on the determined second route comprise one or more processors configured to:

determine one or more third candidate relay nodes, the third candidate relay nodes located within a communication range of the first source node;

determine which of the one or more third candidate relay nodes maximizes the energy-harvesting routing metric, wherein the determination of which of the one or more third candidate relay nodes maximizes the energy-harvesting routing metric is based on an energy-harvesting routing metric of the first source node, the second source node, and a first relay node of the second route; and select a third candidate relay node that maximizes the energy-harvesting routing metric as a new first relay node of the first route.

22. The node of claim 21, wherein the one or more processors are further configured to:

determine one or more fourth candidate relay nodes, the fourth candidate relay nodes located within a communication range of the new first relay node of the first route;

determine which of the one or more fourth candidate relay nodes maximizes the energy-harvesting routing metric, wherein the determination of which of the one or more fourth candidate relay nodes maximizes the energy-harvesting routing metric is based on an energy-harvesting routing metric of the new first relay node of the first route, the first relay node of the second route, and the second relay node of the second route; and select a fourth candidate relay node that maximizes the energy-harvesting routing metric as a new second relay node of the first route.

23. The node of claim 20, wherein the one or more processors are further configured to:

optimize the determined second route based on the optimized first route, wherein the optimized second route maximizes the energy-harvesting routing metric.

24. The node of claim 23, wherein the one or more processors are further configured to:

continue to optimize the determined first and second routes until the energy-harvesting routing metric for both the first and second routes exceeds a threshold value.

25. The node of claim 17, wherein maximizing the energy-harvesting routing metric comprises maximizing an achievable rate between consecutive relay nodes.

26. The node of claim 17, wherein the energy-harvesting routing metric comprises a multiple input multiple output (MIMO) channel capacity.

27. The node of claim 17, wherein the energy-harvesting routing metric is a function of a signal-to-noise ratio.

28. The node of claim 17, wherein the one or more processors are configured to maximize the energy-harvesting routing metric by maximizing interference between routes.

29. The node of claim 17, wherein the relay nodes perform noisy network coding.

30. The node of claim 17, wherein the one or more processors are further configured to:

define a plurality of subnetworks, the defined plurality of subnetworks comprising at least a first subnetwork comprising the destination and the first and second source nodes and a second subnetwork comprising a second destination and a plurality of source nodes associated with the second destination, the plurality of source nodes including at least one additional source node;

determine a first route for the second subnetwork from one of the plurality of source nodes associated with the second destination to the second destination, the first route for the second subnetwork comprising one or more relay nodes;

determine a second route for the second subnetwork from another of the plurality of source nodes associated with the second destination to the second destination, the determined second route for the second subnetwork comprising one or more relay nodes selected to maximize the determined energy-harvesting routing metric; and optimize the determined first route for the second subnetwork based on the determined second route for the second subnetwork, the second route for the second subnetwork comprising one or more relay nodes selected according to the determined energy-harvesting routing metric, wherein the optimized first route for the second subnetwork maximizes the energy-harvesting routing metric.

31. The node of claim 30, wherein the first route for the second subnetwork is determined using interference-aware routing.

32. The node of claim 17, wherein the first route and the second route comprise different numbers of relay nodes.

33. A computer program product comprising instructions stored on non-transient computer-readable media which, when executed by one or more processors, perform the acts of:

determining a first route from a first source node to a destination, the first route comprising one or more relay nodes;

determining an energy-harvesting routing metric, the energy-harvesting routing metric for use in determining a second route from a second source node to the destination;

determining the second route from the second source node to the destination, the determined second route comprising one or more relay nodes selected to maximize the determined energy-harvesting routing metric;

transmitting at least a portion of the second route to one or more of the second source node and the one or more relay nodes for use by the second source node to transmit data to the destination; and wherein determining the second route from the second source node to the destination comprises:

determining one or more first candidate relay nodes, the first candidate relay nodes located within a communication range of the second source node;

determining which of the one or more first candidate relay nodes maximizes the energy-harvesting routing metric, wherein the determination of which of the one or more first candidate relay nodes maximizes the energy-harvesting routing metric is based on energy-harvesting routing metrics of the first source node, the second source node, and a first relay node of the first route; and selecting a first candidate relay node that maximizes the energy-harvesting routing metric as the first relay node of the second route.

* * * * *